(12) United States Patent
Kim et al.

(10) Patent No.: US 11,799,317 B2
(45) Date of Patent: Oct. 24, 2023

(54) POWER SUPPLY SYSTEM

(71) Applicant: LS ELECTRIC CO., LTD., Anyang-si (KR)

(72) Inventors: Dohyun Kim, Anyang-si (KR); Dongjin Yun, Anyang-si (KR); Minjun Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 349 days.

(21) Appl. No.: 17/275,936

(22) PCT Filed: Sep. 3, 2019

(86) PCT No.: PCT/KR2019/011292
§ 371 (c)(1),
(2) Date: Mar. 12, 2021

(87) PCT Pub. No.: WO2020/055021
PCT Pub. Date: Mar. 19, 2020

(65) Prior Publication Data
US 2021/0288519 A1    Sep. 16, 2021

(30) Foreign Application Priority Data

Sep. 13, 2018   (KR) .................... 10-2018-0109540

(51) Int. Cl.
*H02J 1/10*    (2006.01)
*H02J 9/06*    (2006.01)
(Continued)

(52) U.S. Cl.
CPC .............. *H02J 9/061* (2013.01); *H02J 1/102* (2013.01); *H02J 3/0073* (2020.01); *H02J 9/068* (2020.01);
(Continued)

(58) Field of Classification Search
CPC .......... H02J 3/0073; H02J 1/102; H02J 9/061; H02J 9/068; H02J 13/0004; H02M 1/0032
See application file for complete search history.

(56) References Cited

U.S. PATENT DOCUMENTS 7,652,393 B2   1/2010   Moth
9,093,861 B2   7/2015   Nakano et al.
(Continued)

FOREIGN PATENT DOCUMENTS

EP   2442417 B1   3/2016
JP   S6370241 U   5/1988
(Continued)

OTHER PUBLICATIONS

Notice of Allowance for related Korean Application No. 10-2018-0109540; action dated Nov. 12, 2021; (2 pages).
(Continued)

*Primary Examiner* — Harry R Behm
(74) *Attorney, Agent, or Firm* — K&L Gates LLP

(57) ABSTRACT

The present specification relates to a power supply system which enables uninterruptible power supply, wherein a circuit breaker is provided to switch on/off each of electric circuits via which a plurality of power supply devices are connected, and thus the UPS function can be performed among the plurality of power supply devices by opening or closing the circuit breaker according to various situations occurring in the system to control power reception and supply.

15 Claims, 7 Drawing Sheets

(51) Int. Cl.
　　　*H02J 13/00*　　　(2006.01)
　　　*H02M 1/00*　　　(2006.01)
　　　*H02J 3/00*　　　(2006.01)
(52) U.S. Cl.
　　　CPC ....... *H02J 13/0004* (2020.01); *H02M 1/0032* (2021.05)

(56) References Cited

U.S. PATENT DOCUMENTS

| | | | |
|---|---|---|---|
| 2011/0254368 A1 | 10/2011 | Boe | |
| 2014/0054964 A1* | 2/2014 | Edelen | H02J 9/062 307/65 |
| 2015/0074431 A1* | 3/2015 | Nguyen | G06F 1/30 713/300 |
| 2017/0373498 A1* | 12/2017 | Haugan | H02H 3/32 |
| 2019/0363628 A1* | 11/2019 | Haugan | H02J 1/00 |

FOREIGN PATENT DOCUMENTS

| | | |
|---|---|---|
| JP | H0879986 A | 3/1996 |
| JP | H11266532 A | 9/1999 |
| JP | 2001327100 A | 11/2001 |
| JP | 2010512723 A | 4/2010 |
| JP | 2011151929 A | 8/2011 |
| JP | 2013223425 A | 10/2013 |
| JP | 2015515243 A | 5/2015 |
| JP | 2017516451 A | 6/2017 |
| JP | 2017519478 A | 7/2017 |
| KR | 101223260 B1 | 1/2013 |
| KR | 20180066682 A | 12/2016 |
| KR | 20180099277 A | 2/2017 |
| KR | 1020170015540 | 2/2017 |
| WO | 2014026840 A2 | 2/2014 |

OTHER PUBLICATIONS

Notice of Allowance for related Japanese Application No. 2021-513914; action dated Dec. 20, 2022; (14 pages).
International Search Report for related International Application No. PCT/KR2019/011292; report dated Mar. 19, 2020; (5 pages).
Written Opinion for related International Application No. PCT/KR2019/011292; report dated Mar. 19, 2020; (5 pages).
Japanese Office Action for related Japanese Application No. 2021-513914; action dated May 10, 2022; (5 pages).
Korean Office Action for related Korean Application No. 10-2018-0109540; action dated Apr. 29, 2021; (5 pages).

* cited by examiner

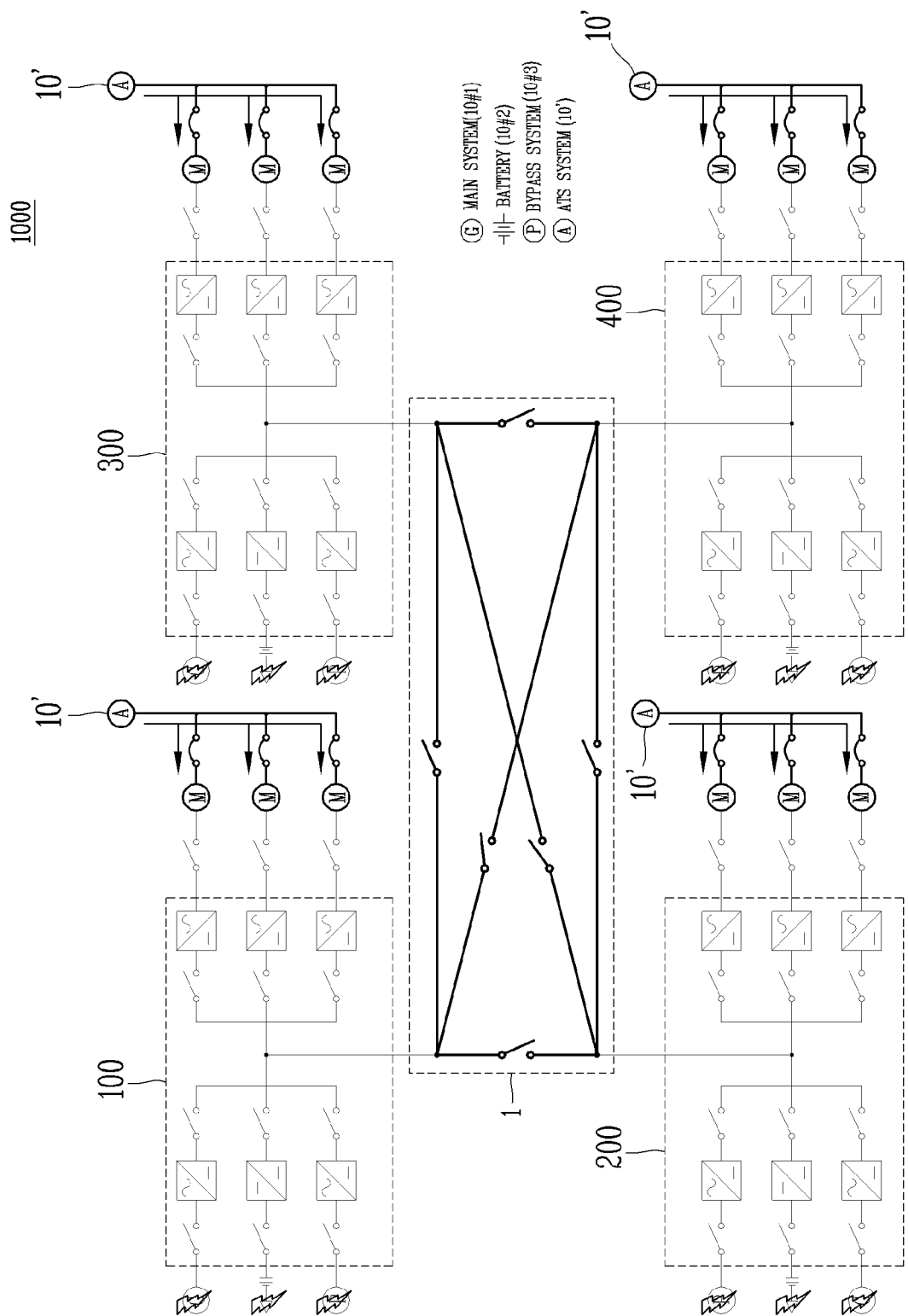

POWER SUPPLY SYSTEM

CROSS-REFERENCE TO RELATED APPLICATIONS

This application is the National Stage filing under 35 U.S.C. 371 of International Application No. PCT/KR2019/011292, filed on Sep. 3, 2019, which claims the benefit of earlier filing date and right of priority to Korean Application No. 10-2018-0109540, filed on Sep. 13, 2018, the contents of which are all hereby incorporated by reference herein in their entirety.

FIELD

The present disclosure relates to a power supply system capable of uninterruptibly supplying power.

BACKGROUND

A technology that is the background of the present disclosure relates to a system including a plurality of power supply devices.

A system in which a plurality of power supply devices supplies power to each load may be connected in common through a DC bus line. When connected to a common bus line as described above, there is an advantage capable of receiving and supplying power from and to an adjacent power device through the DC bus line. However, when the system is configured in this way, there are limitations such as system stability problem, difficulty in controlling power reception and supply, and a lack of countermeasures in case of an accident.

Since a large number of power devices having a complex configuration are provided, system operation cannot be stably carried out when compatibility between devices is poor. Furthermore, when a load to which each device supplies power is a critical load that needs power supply at all times, it may be required to provide a separate UPS device for an abnormal condition, but when a UPS device is provided, the configuration of the system may become more complicated, and the provision of the UPS device itself may not be easy due to structural/design constraints. In addition, as the configuration becomes more complicated, the control of each device and system is inevitably more complex, and the risk of occurrence of failures and accidents increases. As a result, stable and reliable power supply may not be carried out so as to cause an unstable operation of a load, and an appropriate operational response to the occurrence of various accidents may not be made.

SUMMARY

An aspect of the present disclosure is to improve the limitations of the related art as described above.

In other words, the present specification aims to provide a power supply system capable of improving the limitations of the related art.

Specifically, an aspect of the present disclosure is to provide a power supply system, capable of allowing power reception and power supply among a plurality of power supply devices provided in the system, so as to enable a UPS function among the plurality of power supply devices.

Another aspect of the present disclosure is to provide a power supply system capable of effectively maintaining power supply to loads in various abnormal situations.

Another aspect of the present disclosure is to provide a power supply system capable of performing power reception and supply appropriately and stably, in response to various abnormal situations.

In order to achieve those aspects and other advantages, a power supply system according to the present disclosure may include circuit breakers controlling respective electric circuits to which a plurality of power supply devices is connected, thereby opening and closing the circuit breakers according to various situations occurring in the system to control power reception and power supply.

In other words, as a technical feature, a power supply system according to the present disclosure may include circuit breakers corresponding to a plurality of power supply devices to control the circuit breakers so as to receive and supply power, thereby enabling a UPS function among the plurality of power supply devices.

The above technical features may be applied to a power supply system, and this specification may provide embodiments of a power supply system having the above technical features.

An embodiment of a power supply system to achieve those technical features of the present disclosure may include a plurality of power panels to convert power supplied from at least one power supply source into Direct-Current (DC) power, convert the DC power into driving power of a load, and supply the driving power to the load, and a plurality of circuit breakers disposed between power ends, through which the DC power is input and output in the plurality of power panels, respectively. The plurality of circuit breakers may be opened or closed depending on a power supply state of at least one of the plurality of power panels, so as to connect or disconnect the DC power among the plurality of power panels.

In one embodiment of the power supply system, the at least one supply source may include first and second AC power sources to supply AC power, and a battery power source to store DC power and supply the stored power to the plurality of power panels while power supply of the first and second AC power sources is restored in a switching manner when the power supply is interrupted.

In one embodiment of the power supply system, the battery power source may uninterruptibly supply the stored power to the plurality of power panels until the interrupted power supply is restored in the switching manner.

In one embodiment of the power supply system, the at least one power supply source may further include an emergency power source to supply emergency power to the load when the power supply of the first AC power source, the second AC power source, and the battery power source is interrupted.

In one embodiment of the power supply system, each of the plurality of power panels may include at least one first power conversion device to convert power supplied from the at least one power supply source into the DC power, and a second power conversion device to convert the DC power supplied from the at least one first power conversion device into the driving power and supply the driving power to the load.

In one embodiment of the power supply system, the plurality of power panels may supply the DC power to the second power conversion device through any one of the at least one first power conversion device according to a state of the at least one power supply source.

In one embodiment of the power supply system, the plurality of power panels may be configured such that, in a case where power supply of one conversion device that supplies the DC power to the second power conversion device is interrupted, the DC power is supplied to the second power conversion device through another conversion device other than the one conversion device.

In one embodiment of the power supply system, the at least one first power conversion device may be configured such that the DC power is supplied to the second power conversion device through a conversion device which receives power from the battery power source, while the one conversion device is switched to the another conversion device.

In one embodiment of the power supply system, the plurality of power panels may be configured such that a power end of one power panel is connected to power ends of other power panels.

In one embodiment of the power supply system, the plurality of circuit breakers may be disposed between the power end of the one power panel and the power ends of the other power supply panels, respectively.

In one embodiment of the power supply system, the power supply system may further include a plurality of DC electric circuits through which the power ends are connected to one another. The plurality of circuit breakers may be arranged on the plurality of DC electric circuits, respectively, to connect or disconnect the DC power on the plurality of DC electric circuits.

In one embodiment of the power supply system, the plurality of circuit breakers may be provided by a number that a power end of any one of the plurality of power panels is connected to power ends of other power panels.

In one embodiment of the power supply system, the plurality of circuit breakers may be provided by a number of N(N−1)/2 when a number of the plurality of power panels is N.

In one embodiment of the power supply system, the plurality of circuit breakers may be closed when connecting the DC power among the plurality of power panels, and opened when disconnecting the DC power among the plurality of power panels.

In one embodiment of the power supply system, when power supply of at least one of the plurality of power panels is interrupted, a circuit breaker of a power panel which is interrupted in power supply and a circuit breaker, which is disposed between the interrupted power panel and a power panel adjacent to the interrupted power panel, among the plurality of circuit breakers, may be closed to connect the interrupted power panel to the adjacent power panel, such that the DC power is supplied from the adjacent power panel to the interrupted power panel.

In one embodiment of the power supply system, the interrupted power panel may supply the DC power through a conversion device connected to the battery power source until the DC power is supplied from the adjacent power panel after the power supply is interrupted.

In one embodiment of the power supply system, the power supply system may further include a control device to monitor a state of at least one of the plurality of power panels and the plurality of circuit breakers to control the at least one of the plurality of power panels and the plurality of circuit breakers.

In addition, a power supply system to achieve those technical features of the present disclosure may a plurality of power panels to convert power supplied from each of at least one power supply source into DC power, convert the DC power into driving power for driving a load, and supply the driving power to the load, a plurality of DC electric circuits connected in common to output ends, through which the DC power flows in each of the plurality of power panels, so as to transfer the DC power output from each of the plurality of power panels, a plurality of circuit breakers disposed on the plurality of DC electric circuits, through which the output ends of the plurality of power panels are connected to one another, so as to control a connection among the plurality of power panels, and a control device to control opening and closing of the plurality of circuit breakers according to states of the plurality of power panels so as to control reception and supply of the DC power among the plurality of power panels through the plurality of DC electric circuits.

In one embodiment of the power supply system, each of the plurality of power panels may be configured such that an output end for outputting the DC power is connected to three of the plurality of circuit breakers.

In one embodiment of the power supply system, the plurality of power panels may be configured such that an output end of one power panel is connected to output ends of other power panels, respectively.

In one embodiment of the power supply system, the plurality of power panels may be configured such that any one of the at least one first power conversion device which converts supplied power into the DC power is selected according to a state of the at least one power supply source, to transfer the DC power to a second power conversion device, which converts the DC power into the driving power, through the selected converter.

In one embodiment of the power supply system, the plurality of power panels may be configured such that, when a fault has occurred in at least one of one converter, which is transferring the DC power to a second power conversion device converting the DC power into the driving power, and a power supply source corresponding to the one converter, the DC power is transferred to the second power conversion device through another converter other than the one converter.

In one embodiment of the power supply system, when a fault has occurred in at least one of the plurality of power panels, the control device may close a circuit breaker on any one of electric circuits connected to a fault-occurred power panel and a power panel adjacent to the fault-occurred power panel, such that the fault-occurred power panel receives the DC power from the adjacent power panel.

The power supply system according to the present disclosure as described above may be applied to a power supply device, a power supply system, and a method of operating the power supply system that supply/use DC power. In particular, the power supply system according to the present disclosure may be usefully applied to a DC UPS module and a power supply system having the same. However, the technology disclosed in this specification is not limited thereto, and may also be applied to all of a power source device, a power supply device, a power control device, a power supply system, a power system, a power control system, a plant system, a plant control system, a plant control method, an energy storage system, a method of controlling or operating an energy storage system, a motor control panel for controlling a plurality of motor loads, a motor control system, a motor operation system, and the like.

A power supply system according to the present disclosure may control a circuit breaker of each of a plurality of power supply devices connected to one another to control the reception and supply of power, thereby enabling a UPS function among the plurality of power supply devices.

Accordingly, even if various abnormal situations occur on the system, power supply to loads can be maintained without interruption.

In other words, the power supply system according to the present disclosure may have an effect capable of achieving an appropriate and stable power supply response to various abnormal situations occurring on the system.

In the power supply system according to the present disclosure, the reception and supply of power can be controlled by controlling circuit breakers of a plurality of power supply devices connected to one another according to occurred situations, thereby allowing an efficient operation with the least elements.

The power supply system according to the present disclosure has an effect of increasing stability, reliability, and effectiveness of an operation of a large-capacity system.

Accordingly, the power supply system according to the present disclosure can achieve those aforementioned aspects and other advantages, thereby overcoming the limitations of the related art.

BRIEF DESCRIPTION OF THE DRAWINGS

FIG. 7 is an exemplary view 4 illustrating a detailed embodiment of a power supply system in accordance with the present disclosure.

DETAILED DESCRIPTION

Figure 1:
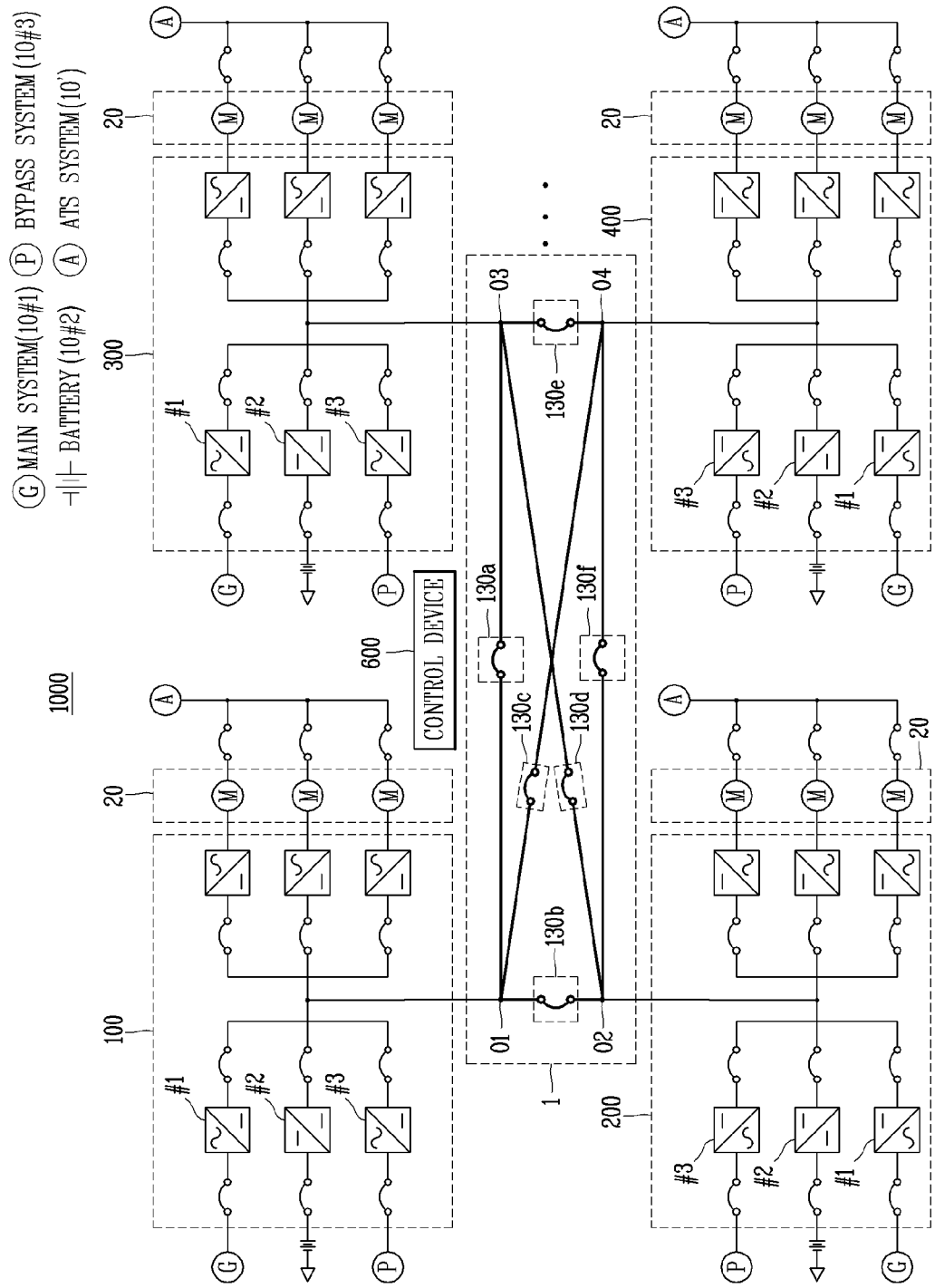
FIG. 1 is a diagram illustrating a configuration of a power supply system according to the present disclosure.

It should be noted that technological terms used herein are merely used to describe a specific embodiment, but not to limit the concept of the technology disclosed in the present specification. Also, unless particularly defined otherwise, technological terms used herein should be construed as a meaning that is generally understood by those having ordinary skill in the field to which the technology disclosed in the present specification belongs, and should not be construed too broadly or too narrowly. Furthermore, if technological terms used herein are wrong terms unable to correctly express the concept of the technology disclosed in the present specification, then they should be replaced by technical terms that are properly understood by those skilled in the art. In addition, general terms used in the present specification should be construed based on the definition of dictionary, or the context, and should not be construed too broadly or too narrowly.

In addition, the singular expression used in the present specification includes a plurality of expressions unless the context clearly indicates otherwise. In this specification, the terms "comprising" and "including" should not be construed to necessarily include all of the elements or steps disclosed herein, and should be construed not to include some of the elements or steps thereof, or should be construed to further include additional elements or steps.

Hereinafter, the embodiments disclosed herein will be described in detail with reference to the accompanying drawings, and the same or similar elements are designated with the same numeral references regardless of the numerals in the drawings and their redundant description will be omitted.

In describing the technology disclosed herein, moreover, the detailed description will be omitted when specific description for publicly known technologies to which the invention pertains is judged to obscure the gist of the technology disclosed in the present specification. Also, it should be noted that the accompanying drawings are merely illustrated to easily explain the concept of the technology disclosed in the present specification, and therefore, they should not be construed to limit the concept of the technology by the accompanying drawings.

Hereinafter, an embodiment of a power supply system according to the present disclosure will be described.

The power supply system may be implemented in a combined or separate form of embodiments to be described below.

The power supply system may be a power supply system including a plurality of power supply devices.

The power supply system may include a plurality of packaged power devices to supply power.

Here, the power device may be a power panel in which a plurality of power control devices is packaged.

As illustrated in FIG. 1, the power supply system 1000 may include a plurality of power panels 100, 200, 300, 400 to convert power supplied from at least one power supply source 10 into DC power, convert the DC power into driving power of a load 20, and supply the driving power to the load 20, and a plurality of circuit breakers 130 disposed between power ends, through which the DC power is input and output in each of the plurality of power panels 100, 200, 300, 400. The plurality of circuit breakers 130 may be opened or closed depending on a power supply state of at least one of the plurality of power panels 100, 200, 300, 400, to connect or disconnect the DC power among the plurality of power panels 100, 200, 300, 400.

Figure 2:
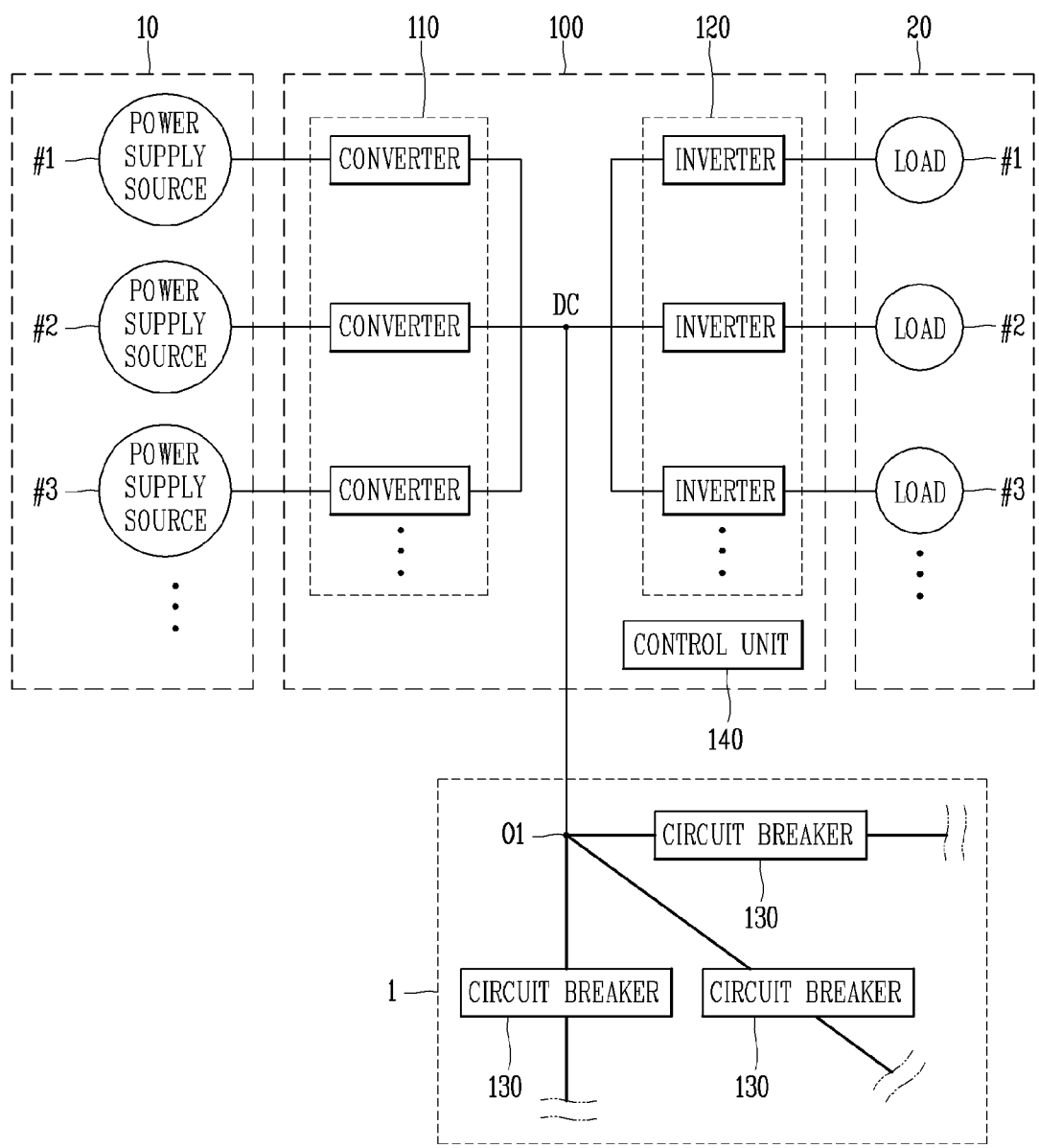
FIG. 2 is a diagram illustrating a configuration of a power panel of a power supply system according to the present disclosure.
Figure 3:
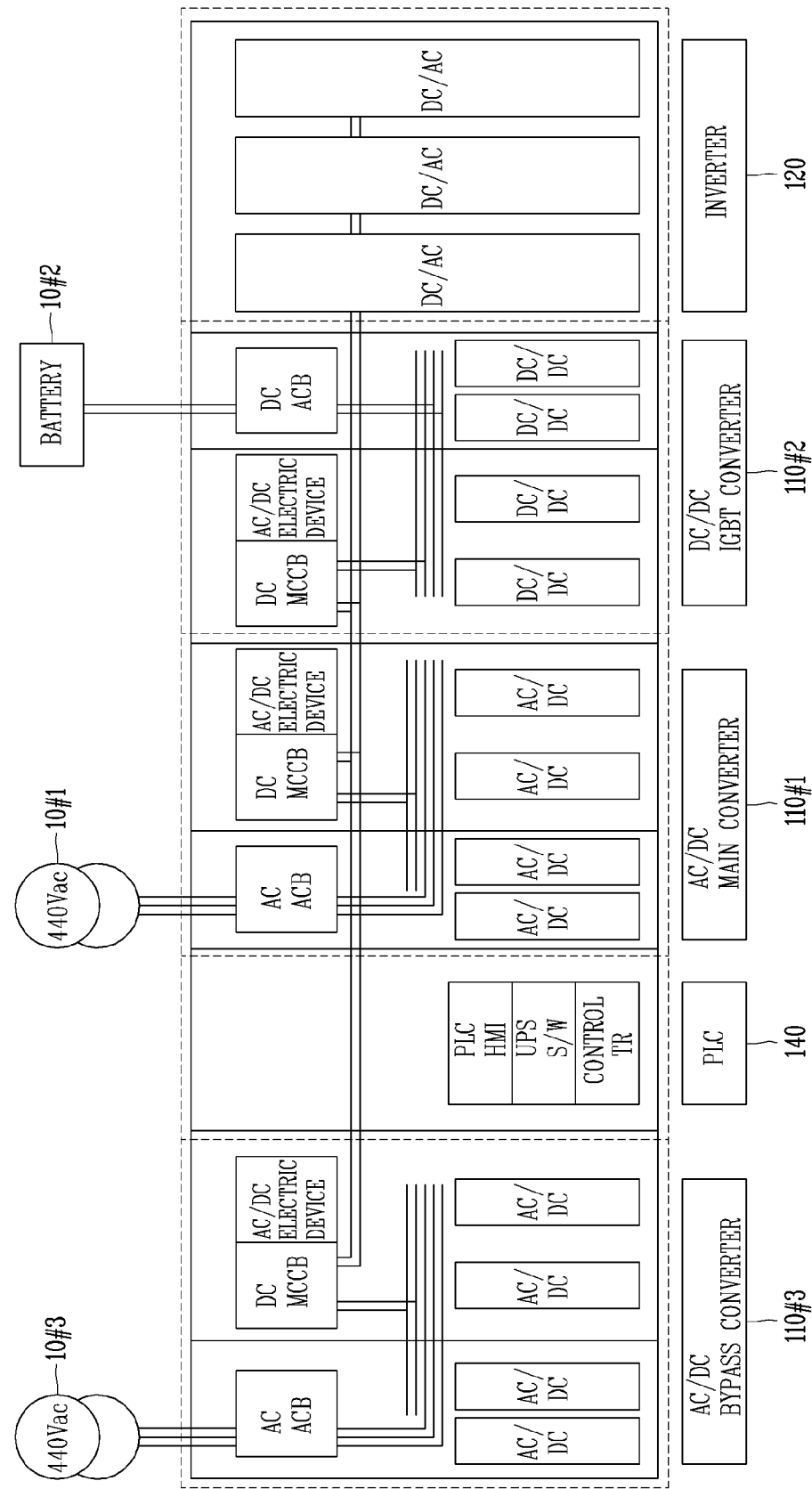
FIG. 3 is a diagram showing a specific structural configuration of a power panel of a power supply system according to the present disclosure.

Here, each of the plurality of power panels 100, 200, 300, 400 may be a power supply device 100 as illustrated in FIGS. 2 and 3.

In other words, the power panel 100 may be configured as a power supply device as illustrated in FIGS. 2 and 3, and the power supply system 1000 may include a power panel in plurality configured in the form of the power supply device 100 as illustrated in FIGS. 2 and 3, thereby including the plurality of power panels 100, 200, 300, 400.

The power panel 100 may be a module including a plurality of power control devices.

The power panel 100 may be a power device in which the plurality of power control devices is packaged.

For example, the power panel 100 may be a power panel in which the plurality of power control devices is packaged.

The power panel 100 may be a package-type power panel which supplies power by being provided in a building requiring high power such as a power plant, a plant, a factory, and an apartment.

The power panel 100 may also be a package-type power panel configured in any one space.

The power panel 100 may be packaged with the plurality of power control devices to supply power to a load.

The power panel 100, as illustrated in FIG. 2, may include at least one first power conversion device 110 that converts power supplied from each of the at least one power supply source 10 into DC power, at least one second power conversion device 120 that converts the DC power into the driving power for driving the load 20 and supplies the driving power to the load 20, and a control unit 140, 240, 340, 440 that controls reception and supply of the DC power according to a state of the DC power or the driving power.

As such, the power panel 100 may include the first power conversion device 110, the second power conversion device 120, and the control unit 140, 240, 340, 440 to convert power supplied from the at least one power supply source 10 into the driving power and supply the driving power to the load 20.

A specific configuration of the power panel 100 including the first power conversion device 110, the second power conversion device 120, and the control unit 140, 240, 340, 440 are illustrated as in FIGS. 2 and 3.

The at least one power supply source 10 that supplies power to the power panel 100 may be externally connected to the at least one first power conversion device 110 to supply power to each of the at least one power first conversion device 110.

Each of the at least one power supply source 10 may be connected to each of the at least one first power conversion device 110 to supply DC or AC power to each of the at least one first power conversion device 110.

The at least one power supply source 10 may include a first AC power source 10 #1 and a second AC power source 10 #3 that supply AC power, and a battery power source 10 #2 that stores DC power, as illustrated in FIGS. 2 and 3.

Here, the first AC power source 10 #1 may be a main system power source G that supplies AC power, the second AC power source 10 #3 may be a bypass system power source P that supplies AC power, and the battery power source 10 #2 may be a battery power source B that supplies DC power.

Figure 4:
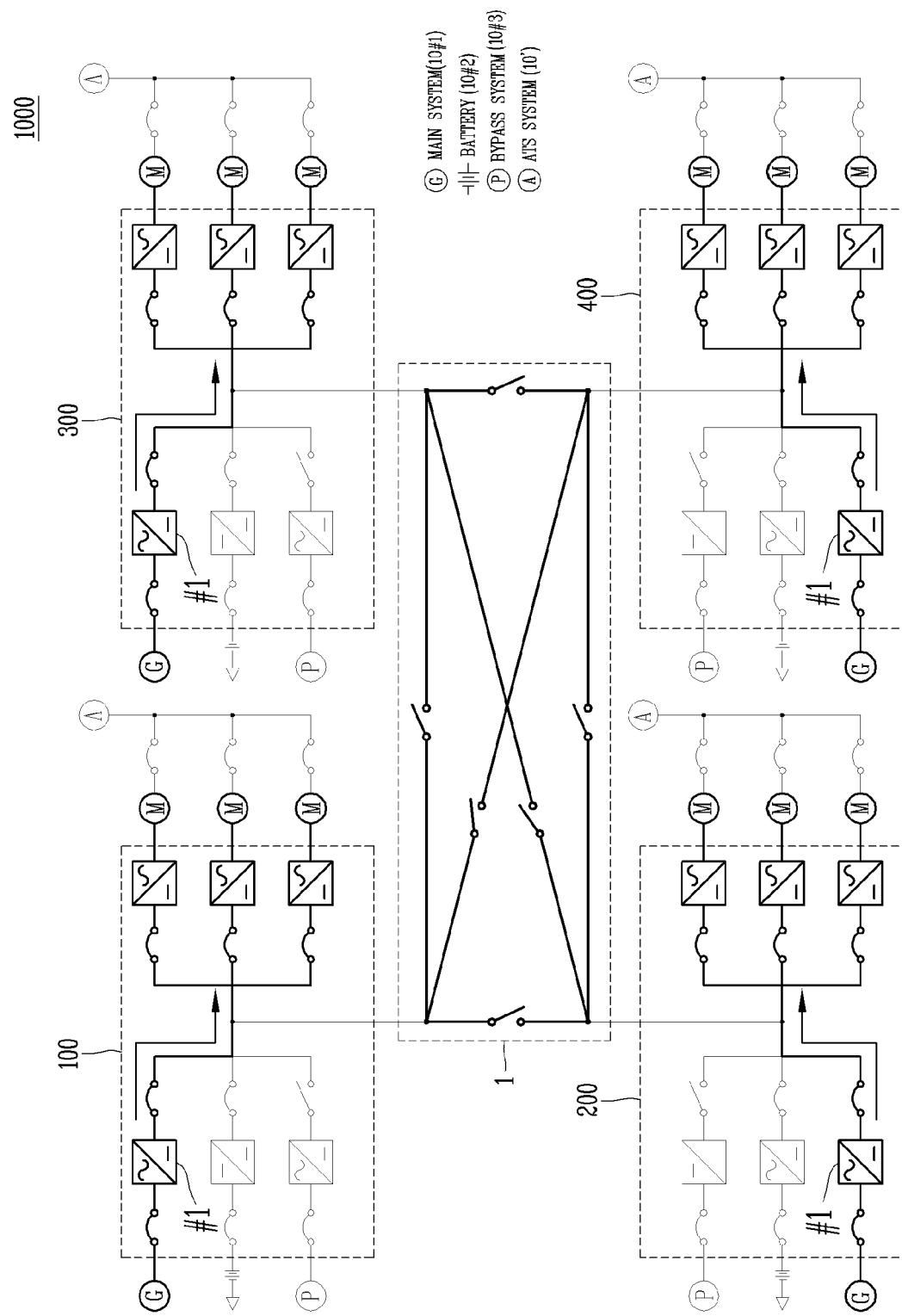
FIG. 4 is an exemplary view 1 illustrating a detailed embodiment of a power supply system in accordance with the present disclosure.

In other words, the at least one power supply source 10 may include a system power source G, a bypass power source P, and a battery power source B, as illustrated in FIG. 4.

Accordingly, each of the plurality of power panels 100, 200, 300, 400 may receive power from each of the system power source G, the bypass power source P, and the battery power source B.

The first AC power source 10 #1 may be a system power source G.

The first AC power source 10 #1 may be a system power source G that supplies AC power of 440 [V].

The second AC power source 10 #3 may be a bypass power source P.

The second AC power source 10 #3 may be a bypass power source P that supplies AC power of 440 [V].

The battery power source 10 #2 may be an emergency battery source that stores DC power and supplies the stored DC power in an emergency.

The battery power source 10 #2 may supply stored DC power to the power panel 100 when an abnormality (or fault) has occurred in the first AC power source and the second AC power source.

The battery power source B may store the DC power. When the power supply of the first AC power source 10 #1 and the second AC power source 10 #3 is interrupted, the battery power source B may supply the stored power to the plurality of power panels 100, 200, 300, 400 while the interrupted power supply is restored in a switching manner.

The battery power source B may uninterruptibly supply the stored power to the plurality of power panels 100, 200, 300, 400 until the interrupted power supply is restored in a switching manner.

The at least one power supply source 10 may also further include an emergency power source A that supplies emergency power to the load 20 when the power supply of the first AC power source G, the second AC power source P, and the battery power source B is interrupted.

When a fault has occurred in the first AC power source G, the second AC power source P, and the battery power source B, the emergency power source A may supply emergency generation power to the load 20.

The emergency power source A may be a power source for keeping the loads 20 operated for a predetermined period of time by supplying emergency power to each load 20 when power cannot be supplied due to an occurrence of fault conditions in all of the first AC power source G, the second AC power source P, and the battery power source B each supplying power to the plurality of power panels 100, 200, 300, 400.

For example, the emergency power source A may be a power source including an emergency generator.

Each of the plurality of power panels 100, 200, 300, 400 may preferably receive power supplied from three power supply sources 10, namely, the system power source G, the bypass power source P, and the battery power source B, as illustrated in FIG. 1A, and receive power from the emergency power source A only when the power supply from the system power source G, the bypass power source P, and the battery power source B is interrupted.

Here, the at least one power supply source 10 supplying power to each of the plurality of power panels 100, 200, 300, 400 may supply power to each of the plurality of power panels 100, 200, 300, 400 in one system or from a separate distributing panel.

Each of the plurality of power panels 100, 200, 300, 400 may include the at least one first power conversion device 110, 210, 310, 410 to convert power supplied from the at least one power supply source 10 into the DC power, and the second power conversion device 120, 220, 320, 420 to convert the DC power supplied from the at least one first power conversion device 110, 210, 310, 410 into the driving power and supply the driving power to the load 20.

Here, the at least one first power conversion device 110, 210, 310, 410 and the second power conversion device 120, 220, 320, 420 may be provided in plurality.

Each of the plurality of power panels 100, 200, 300, 400 may supply the DC power to the at least one second power conversion device 120, 220, 320, 420 through one of the at least one first power conversion device 110, 210, 310, 410 according to the state of the at least one power supply source 10.

The first power conversion device 110, 210, 310, 410, which is a device for converting the supplied power into the DC power, may be a converter, for instance.

The first power conversion device 110, 210, 310, 410 may be an AC/DC converter that converts AC power into DC power, or a DC/DC converter that converts DC power into DC power.

The at least one first power conversion device 110, 210, 310, 410 may include at least one of an AC/DC converter that converts AC power into DC power, and a DC/DC converter that converts a level of DC power.

The at least one first power conversion device 110, 210, 310, 410 may include three conversion devices 110 #1 to 110

3, 210 #1 to 210 #3, 310 #1 to 310 #3, 410 #1 to 410 #3 corresponding to the at least one power supply source 10.

The at least one first power conversion device 110, 210, 310, 410 may include first to third conversion devices 110 #1 to 110 #3, 210 #1 to 210 #3, 310 #1 to 310 #3, and 410 #1 to 410 #3 connected to the first AC power source 10 #1, the battery power source 10 #2, and the second AC power source 10 #3, respectively, to receive power from the connected power supply sources.

According to this, the first AC power source 10 #1 may be connected to the first conversion device 110 #1, 210 #1, 310 #1, 410 #1 to supply AC power to the first conversion device 110 #1, 210 #1, 310 #1, 410 #1, the battery power source 10 #2 may be connected to the second conversion device 110 #2, 210 #2, 310 #2, 410 #2 to supply DC power to the second conversion device 110 #2, 210 #2, 310 #2, 410 #2, and the second AC power source 10 #3 may be connected to the third conversion device 110 #3, 210 #3, 310 #3, 410 #3 to supply AC power to the third conversion device 110 #3, 210 #3, 310 #3, 410 #3.

The first conversion device 110 #1, 210 #1, 310 #1, 410 #1 may be an AC/DC converter that converts AC power into DC power, the second conversion device 110 #2, 210 #2, 310 #2, 410 #2 may be a DC/DC converter that converts a level of DC power, and the third conversion device 110 #3, 210 #3, 310 #3, 410 #3 may be an AC/DC converter that converts AC power into DC power.

The at least one first power conversion device 110, 210, 310, 410 may include opening and closing mechanisms provided on front and rear ends for opening or closing the front and rear ends.

The opening and closing mechanisms may be switches that are provided on an input end and an output end of each of the at least one second conversion device 110, 210, 310, 410 to control power input and output to and from the at least one first power conversion device 110, 210, 310, 410.

Here, the opening and closing mechanism provided on the input end may be a circuit breaker that breaks a circuit when detecting an overcurrent.

More specifically, Air Circuit Breakers (ACBs) may be provided on the input ends of the first conversion device 110 #1, 210 #1, 310 #1, 410 #1 and the third conversion device 110 #3, 210 #3, 310 #3, 410 #3, which receives AC power from the first AC power source 10 #1 and the second AC power source 10 #3. A Molded Case Circuit Breaker (MCCB) may be provided on the input end of the second conversion device 110 #2, 210 #2, 310 #2, 410 #2, which receives DC power from the battery power source 10 #2.

The opening and closing mechanisms may be switched on or off to connect or disconnect the at least one first power conversion device 110, 210, 310, 410 according to the operation of the at least one first power conversion device 110, 210, 310, 410.

For example, when power is not supplied from the at least one power supply source 10, the opening and closing mechanisms provided on the input end and output end may be open so as to disconnect the conversion device.

The output end of each of the at least one first power conversion device 110, 210, 310, 410 may be connected to one power end O1, O2, O3, O4.

In other words, the output end of each of the at least one first power conversion device 110, 210, 310, 410 may be connected in common to the power ends O1, O2, O3, O4, such that the DC power converted in the at least one first power conversion device 110, 210, 310, 410 can flow therethrough.

Accordingly, the power end O1, O2, O3, O4 may be an electric circuit, which is connected in common to the output end of each of the at least one first power conversion device 110, 210, 310, 410 so that the DC power output from the at least one first power conversion device 110, 210, 310, 410 flows therethrough.

The power end O1, O2, O3, O4 of one power panel may be connected to the power end O1, O2, O3, O4 of each of other power panels and the input end of the second power conversion device 120, 220, 320, 420.

The power end O1, O2, O3, O4 of the one power panel may be connected to the power ends O1, O2, O3, O4 of the other power panels, respectively, so as to be connected to the other power panels.

The power end O1, O2, O3, O4 of the one power panel may be connected to the power ends O1, O2, O3, O4 of the other power panels 100, 200, 300, 400 and the input end of the second power conversion device 120, 220, 320, 420, respectively, so as to output the DC power to the other power panels 100, 200, 300, 400 or to the second power conversion device 120, 220, 320, 420.

Each power end O1, O2, O3, O4 may be connected to three of the plurality of circuit breakers 130.

In other words, the connection among the power ends O1, O2, O3, O4 may be controlled by any three circuit breakers connected to the power ends O1, O2, O3, O4.

Through this, the DC power transferred among the power ends O1, O2, O3, O4 may be controlled by the circuit breakers connected to the power ends O1, O2, O3, O4.

In this way, the power end O1, O2, O3, O4, which is connected in common to the output end of each of the at least one first power conversion device 110, 210, 310, 410, may be connected to the power end O1, O2, O3, O4 of each of the other power panels 100, 200, 300, 400 and the input end of the second power conversion device 120, 220, 320, 420, respectively, such that the DC power, which has been converted and output through the at least one first power conversion device 110, 210, 310, 410, is transferred through the power end O1, O2, O3, O4.

The DC power which has been converted and output through the at least one first power conversion device 110, 210, 310, 410 may be transferred to the second power conversion device 120, 220, 320, 420.

The at least one first power conversion device 110, 210, 310, 410 may be configured such that one of the first to third conversion devices 110 #1 to 110 #3, 210 #1 to 210 #3, 310 #1 to 310 #3, 410 #1 to 410 #3 is operated to supply the DC power to the second power conversion device 120, 220, 320, 420.

In each of the plurality of power panels 100, 200, 300, 400, when the power supply of any one conversion device 110 #1 to 110 #3, 210 #1 to 210 #3, 310 #1 to 310 #3, 410 #1 to 410 #3 that supplies the DC power to the second power conversion device 120, 220, 320, 420 is interrupted, the DC power may be supplied to the second power conversion device 120, 220, 320, 420 through another conversion device other than the one conversion device 110 #1 to 110 #3, 210 #1 to 210 #3, 310 #1 to 310 #3, 410 #1 to 410 #3.

In case where the power supply of one conversion device 110 #1 to 110 #3, 210 #1 to 210 #3, 310 #1 to 310 #3, 410 #1 to 410 #3 that supplies the DC power to the second power conversion device 120, 220, 320, 420 is interrupted, the at least one first power conversion device 110, 210, 310, 410 may supply the DC power to the second power conversion device 120, 220, 320, 420 through the conversion device 110 #2, 210 #2, 310 #2, 410 #2 that receives power from the battery power source 10 #2 while the one conversion device 110 #1 to 110 #3, 210 #1 to 210 #3, 310 #1 to 310 #3, 410 #1 to 410 #3 is switched to the another conversion device.

Here, the case where the power supply of the one conversion device 110 #1 to 110 #3, 210 #1 to 210 #3, 310 #1 to 310 #3, 410 #1 to 410 #3 is interrupted may be a case where an abnormal (fault) state is detected from at least one of the one conversion device 110 #1 to 110 #3, 210 #1 to 210 #3, 310 #1 to 310 #3, 410 #1 to 410 #3, a power supply source connected to the one conversion device 110 #1 to 110 #3, 210 #1 to 210 #3, 310 #1 to 310 #3, 410 #1 to 410 #3, and a rating of the DC power.

For instance, when the rating of the DC power output from the first conversion device 110 #1, 210 #1, 310 #1, 410 #1 is reduced below a predetermined reference while the first conversion device 110 #1, 210 #1, 310 #1, 410 #1 connected to the first AC power source 10 #1 supplies the DC power to the second power conversion device 120, 220, 320, 420, the third conversion device 110 #3, 210 #3, 310 #3, 410 #3, which is another conversion device other than the first conversion device 110 #1, 210 #1, 310 #1, 410 #1, may supply the DC power to the second power conversion device 120.

In this case, while the first conversion device 110 #1, 210 #1, 310 #1, 410 #1 is switched to the third conversion device 110 #3, 210 #3, 310 #3, 410 #3, the at least one first power conversion device 110, 210, 310, 410 may supply the DC power to the second power conversion device 120, 220, 320, 420 through the second conversion device 110 #2, 210 #2, 310 #2, 410 #2 connected to the battery power source 10 #2.

In other words, when the supply of the DC power to the second power conversion device 120, 220, 320, 420 is interrupted, the second conversion device 110 #2, 210 #2, 310 #2, 410 #2 connected to the battery power source 10 #2 may supply the DC power to the second power conversion device 120, 220, 320, 420 until the supply of the DC power is restored in a switching manner.

The second power conversion device 120, 220, 320, 420 may be provided in plurality.

The second power conversion device 120, 220, 320, 420, which is a device that converts the supplied DC power into the driving power, may be an inverter, for instance.

When the load is a load driven by AC power, the second power conversion devices 120, 220, 320, 420 may be an inverter that converts DC power transferred from the at least one first power conversion device 110, 210, 310, 410 into AC driving power.

When the load is a load driven by DC power, the second power conversion device 120, 220, 320, 420 may be an inverter that converts DC power transferred from the at least one first power conversion device 110, 210, 310 and 410 into DC driving power.

The second power conversion device 120, 220, 320, 420 may be provided by a number corresponding to the load 20.

The load 20 may be provided in plurality.

The second power conversion devices 120, 220, 320, 420 may include at least three inverters 120 #1 to 210 #3, 220 #1 to 220 #3, 320 #1 to 320 #3, 420 #1 to 420 #3 to correspond to the plurality of loads 20.

The second power conversion devices 120, 220, 320, 420 may be connected to the loads 20, respectively, to supply the driving power to the connected loads.

Each of the second power conversion devices 120, 220, 320, 420 may include an opening and closing mechanism for opening and closing a connection at a front end thereof.

The opening and closing mechanism may be a switch which is provided on the input end of the second conversion device 120 to control power input to the second power conversion device 120, 220, 320, 420.

Here, the opening and closing mechanism provided on the input end may be a circuit breaker that breaks a circuit when detecting an overcurrent.

The driving power converted and output by the second power conversion devices 120, 220, 320, 420 may be transferred to each of the loads 20.

Here, the loads 20 may include a motor (M) load.

In each of the plurality of power panels 100, 200, 300, 400, the power end O1 to O4 may be connected to the power ends O1 to O4 of the other power panels 100, 200, 300, 400.

In the plurality of power panels 100, 200, 300, 400, the power end O1 to O4 of one power panel may be connected to the power ends O1 to O4 of the other power panels, 100, 200, 300, 400.

In the plurality of power panels 100, 200, 300, 400, the plurality of circuit breakers 130 may be disposed between the power end O1 to O4 of any one power panel and the power ends O1 to O4 of the other power panels 100, 200, 300, 400, respectively.

The plurality of circuit breakers 130 may be disposed between the power end O1 to O4 of the one power panel and the power ends O1 to O4 of the other power panels, respectively.

In this way, the system 1000 in which the power ends O1 to O4 are connected to one another may further include a plurality of DC electric circuits 1 for connecting the power ends O1 to O4 to one another. The plurality of circuit breakers 130 may be disposed on the plurality of DC electric circuits 1, respectively, to connect or disconnect the DC power on the respective DC electric circuits 1.

The power ends O1 to O4 of the plurality of power panels 100, 200, 300, 400 may be connected to the plurality of circuit breakers 130-130a to 130f provided on the respective DC electric circuits 1.

In each of the plurality of power panels 100, 200, 300, 400, the power end O1 to O4 through which the DC power is output may be connected to any three of the plurality of circuit breakers 130.

In other words, the power end O1 to O4 of each of the plurality of power panels 100, 200, 300, 400 may be connected to three circuit breakers.

For instance, when the number of the plurality of power panels 100, 200, 300, 400 is four as illustrated in FIG. 1, the first power panel 100 may be connected to the first circuit breaker 130a, the second circuit breaker 130b, and the third circuit breaker 130c, the second power panel 200 to the second circuit breaker 130b, the fourth circuit breaker 130f, and the sixth circuit breaker 130f, the third power panel 300 to the first circuit breaker 130a, the fourth circuit breaker 130d, and a fifth circuit breaker 130e, and the fourth power panel 400 to the fourth circuit breaker 130d, the fifth circuit breaker 130e, and the sixth circuit breaker 130f, respectively.

Accordingly, each of the plurality of circuit breakers 130 may be connected to two power panels.

For example, the first circuit breaker 130a may be connected to the first power panel 100 and the third power panel 300, the second circuit breaker 130b may be connected to the first power panel 100 and the second power panel 200, the third circuit breaker 130c may be connected to the first power panel 100 and the fourth power panel 400, the fourth circuit breaker 130d may be connected to the second power panel 200 and the third power panel 300, the fifth circuit breaker 130e may be connected to the third power panel 300 and the fourth power panel 400, and the sixth circuit breaker 130*f* may be connected to the second power panel 200 and the fourth power panel 400.

In the plurality of power panels 100, 200, 300, 400, a power end of any one power panel may be connected to each of power ends of other two power panels.

That is, the plurality of power panels 100, 200, 300, 400 may be connected to one another.

For example, the first power panel 100 may be connected to the second to fourth power panels 200, 300, 400. In more detail, the first power panel 100 may be connected to the third power panel 300 through the first circuit breaker 130*a*, the second power panel 200 through the second circuit breaker 130*b*, and the fourth power panel 400 through the third circuit breaker 130*c*, respectively.

The second power panel 200 may be connected to the first, third, and fourth power panels 100, 300, 400. In more detail, the second power panel 200 may be connected to the first power panel 100 through the second circuit breaker 130*b*, the third power panel 300 through the fourth circuit breaker 130*d*, and the fourth power panel 400 through the sixth circuit breaker 130*f*.

The third power panel 300 may be connected to the first, second, and fourth power panels 100, 200, 400. In more detail, the third power panel 300 may be connected to the first power panel 100 through the first circuit breaker 130*a*, the second power panel 200 through the fourth circuit breaker 130*d*, and the fourth power panel 400 through the fifth circuit breaker 130*e*.

In addition, the fourth power panel 400 may be connected to the first to third power panels 100, 200, and 300. In more detail, the fourth power panel 400 may be connected to the first power panel 100 through the second circuit breaker 130*b*, the third power panel 300 through the fifth circuit breaker 130*e*, and the second power panel 200 through the sixth circuit breaker 130*f*.

The plurality of circuit breakers 130 connected to the power ends O1 to O4 may be DC circuit breakers that cut off DC power.

Each of the power ends O1 to O4 may be connected to any three of the plurality of circuit breakers 130 disposed on the plurality of DC electric circuits 1.

The plurality of circuit breakers 130 may be provided on electric circuits, to which the power ends O1 to O4 of the plurality of power panels 100, 200, 300, 400 are connected, respectively, on the plurality of DC electric circuits 1, so as to control the connection and disconnection among the plurality of power panels 100, 200, 300, 400.

The plurality of circuit breakers 130 may be provided respectively on the electric circuits connected to the power ends O1 to O4, to which the output end of each of the at least one first power conversion device 110, 210, 310, 410 provided in each of the plurality of power panels 100, 200, 300, 400 is connected.

In other words, the plurality of circuit breakers 130 may be provided between the adjacent power ends O1 to O4, respectively, to control the connection between the adjacent power panels 100, 200, 300, 400.

Accordingly, the plurality of power panels 100, 200, 300, 400 may be connected to one another through the plurality of DC electric circuits 1 connected to the power ends O1 to O4, and the connection among the plurality of power panels 100, 200, 300, 400 may be controlled by the opening and closing of the plurality of circuit breakers 130.

The plurality of circuit breakers 130 which is disposed on the plurality of DC electric circuits 1 connected to the respective power ends O1 to O4 to connect or disconnect the power ends O1 to O4 and the plurality of DC electric circuits 1 may be DC-only Molded Case Circuit Breakers (MCCBs).

The plurality of circuit breakers 130 may be opened or closed differently depending on the state of at least one of the DC power, the driving power, the at least one first power conversion device 110, 210, 310, 410, and the load 20, to connect or disconnect the DC power between the adjacent power ends O1 to O4.

Here, the state of the at least one may be at least one of when the DC power is changed from its initial state, when the driving power is changed from its initial state, when the power supply state of the at least one first power conversion device 110, 210, 310, 410 is changed, and when the driving state of the load 20 is changed.

For instance, the state of the at least one may include when the DC power or the driving power falls below a reference rating, when the power supply state is changed due to a failure/accident occurring in the at least one first power conversion device 110, 210, 310, 410, or when the driving state of the load 20 is changed due to reduction of the driving power supplied to the load 20.

The plurality of DC electric circuits 1 may be DC bus lines through which DC power flows.

The plurality of DC electric circuits 1 may indicate DC-dedicated electric circuits to which a plurality of power supply sources is commonly connected to output power.

The plurality of DC electric circuits 1 may be connected to a plurality of DC power supply sources, to output DC power supplied from the plurality of DC power supply sources.

For instance, the plurality of DC electric circuits 1 may be connected to the power ends O1 to O4 of the plurality of power panels 100, 200, 300, 400, respectively, to allow the transfer of the DC power among the plurality of power panels 100, 200, 300, 400.

The plurality of DC electric circuits 1 may preferably have a rating of the magnitude of DC power supplied from one conversion device or the magnitude of DC power supplied from two conversion devices.

That is, the rating of the plurality of DC electric circuits 1 may be a rating at which DC power supplied from at two conversion devices can be transferred.

The DC power may flow on the plurality of DC electric circuits 1 as the plurality of circuit breakers 130 is opened or closed.

In the plurality of DC electric circuits 1, the DC power may flow according to an opening and closing operation of the plurality of circuit breakers 130.

The plurality of DC electric circuits 1 may connect the power ends O1 to O4 to one another in a mesh shape.

In other words, in order to connect the power ends O1 to O4 of the plurality of power panels 100, 200, 300, 400 in the mesh shape, the power ends O1 to O4 of the plurality of power panels 100, 200, 300, 400 may be connected in the mesh shape to the plurality of DC electric circuits 1.

The plurality of DC electric circuits 1 may include electric circuits provided by a number that a power end of any one of the plurality of power panels is connected to power ends of other power panels.

For instance, the plurality of DC electric circuits may include a first electric circuit to which the first power panel 100 and the third power panel 300 are connected, a second electric circuit to which the first power panel 100 and the second power panel 200 are connected, a third electric circuit to which the first power panel 100 and the fourth power panel 400 are connected, a fourth electric circuit to which the second power panel 200 and the third power panel 300 are connected, a fifth electric circuit to which the third power panel 300 and the fourth power panel 400 are connected, and a sixth electric circuit to which the second power panel 200 and the fourth power panel 400 are connected. The first to sixth electric circuits may be formed in the mesh shape.

Here, the first circuit breaker 130a may be provided on the first electric circuit, the second circuit breaker 130b on the second electric circuit, the third circuit breaker 130c on the third electric circuit, the fourth circuit breaker 130d on the fourth electric circuit, the fifth circuit breaker 130e on the fifth electric circuit, and the sixth circuit breaker 130f on the sixth electric circuit, respectively, to control opening and closing of the first to sixth electric circuits.

Accordingly, the plurality of circuit breakers 130 may control the connection among the plurality of power panels 100, 200, 300, 400 through the plurality of DC electric circuits having the plurality of electric circuits configured in the mesh shape.

The plurality of circuit breakers 130 may be provided by a number that a power end of any one of the plurality of power panels 100, 200, 300, 400 is connected to power ends of other power panels.

That is, a power end of one power panel may be connected to output ends of other power panels.

When the number of the power panels 100, 200, 300, 400 is N, the plurality of circuit breakers 130 may be provided by a number of N(N−1)/2.

For example, when the plurality of power panels 100, 200, 300, 400 is four, that is, when N is 4, six circuit breakers of 4(4−1)/2 may be provided.

The plurality of circuit breakers 130 may be opened at normal times and closed during operation, to control the connection and disconnection among the plurality of power panels 100, 200, 300, 400.

Accordingly, each of the plurality of power panels 100, 200, 300, 400 may be connected to other power panels through the opening and closing of each of the plurality of circuit breakers 130.

The plurality of circuit breakers 130 may be closed when connecting the DC power between the plurality of power panels 100, 200, 300, 400, and may be opened when disconnecting the DC power between the plurality of power panels 100, 200, 300, 400.

A form in which each of the plurality of power panels 100, 200, 300, 400 is connected to other power panels through the plurality of circuit breakers 130 may be as illustrated in FIG. 1.

In the plurality of power panels 100, 200, 300, 400, as illustrated in FIG. 1, the power ends O1 to O4 of the first power panel 100, the second power panel 200, the third power panel 300, and the fourth power panel 400 may be connected to the plurality of DC electric circuits 1, and the first to sixth circuit breakers 130a to 130f may be provided between the adjacent power panels 100, 200, 300, 400 connected to the plurality of DC electric circuits 1, respectively.

Hereinafter, the connection form will be described in more detail with reference to FIG. 1.

The first power end O1 of the first power panel 100 may be connected to the plurality of DC electric circuits 1 so as to be connected to the second power end O2 of the second power panel 200, the third power end O3 of the third power panel 300, and the fourth power end O4 of the fourth power panel 400. Here, the second circuit breaker 130b may be provided between the first and second power ends O1 and O2, the first circuit breaker 130a may be provided between the first and third power ends O1 and O3, the third circuit breaker 130c may be provided between the first and fourth power ends O1 and O4, such that the connection between the first and second power panels 100 and 200 may be controlled by the second circuit breaker 130b, the connection between the first and third power panels 100 and 300 may be controlled by the first circuit breaker 130a, and the connection between the first and fourth power panels 100 and 400 may be controlled by the third circuit breaker 130c.

The second power end O2 of the second power panel 200 may be connected to the plurality of DC electric circuits 1 so as to be connected to the first power end O1 of the first power panel 100, the third power end O3 of the third power panel 300, and the fourth power end O4 of the fourth power panel 400. Here, the second circuit breaker 130b may be provided between the first and second power ends O1 and O2, the fourth circuit breaker 130d may be provided between the second and third power ends O2 and O3, and the sixth circuit breaker 130f may be provided between the second and fourth power ends O2 and O4, such that the connection between the first and second power panels 100 and 200 may be controlled by the second circuit breaker 130b, the connection between the second and third power panels 200 and 300 may be controlled by the fourth circuit breaker 130d, and the connection between the second and fourth power panels 200 and 400 may be controlled by the sixth circuit breaker 130f.

The third power end O3 of the third power panel 300 may be connected to the plurality of DC electric circuits 1 so as to be connected to the first power end O2 of the first power panel 100, the second power end O2 of the second power panel 200, and the fourth power end O4 of the fourth power panel 400. Here, the first circuit breaker 130a may be provided between the first and third power ends O1 and O3, the fourth circuit breaker 130d may be provided between the second and third power ends O2 and O3, and the fifth circuit breaker 130e may be provided between the third and fourth power ends O3 and O4, such that the connection between the first and third power panels 100 and 300 may be controlled by the first circuit breaker 130a, the connection between the second and third power panels 200 and 300 may be controlled by the fourth circuit breaker 130d, and the connection between the third and fourth power panels 300 and 400 may be controlled by the fifth circuit breaker 130e.

The fourth power end O4 of the fourth power panel 400 may be connected to the plurality of DC electric circuits 1 so as to be connected to the first power end O2 of the first power panel 100, the second power end O2 of the second power panel 200, and the third power end O3 of the third power panel 300. Here, the third circuit breaker 130c may be provided between the first and fourth power ends O1 and O4, the sixth circuit breaker 130f may be provided between the second and fourth power ends O2 and O4, and the fifth circuit breaker 130e may be provided between the third and fourth power ends O3 and O4, such that the connection between the first and fourth power panels 100 and 400 may be controlled by the third circuit breaker 130c, the connection between the second and fourth power panels 200 and 400 may be controlled by the sixth circuit breaker 130f, and the connection between the third and fourth power panels 300 and 400 may be controlled by the fifth circuit breaker 130e.

As the first to fourth power panels 100, 200, 300, 400 are connected in this way, the power ends O1 to O4 of the plurality of power panels 100, 200, 300, 400 may be connected in the mesh shape.

In this way, by virtue of the interconnection among the plurality of power panels 100, 200, 300, 400, the DC power can flow along the plurality of power panels 100, 200, 300, 400.

That is, as the plurality of power panels 100, 200, 300, 400 is connected to one another, the power ends O1 to O4 of the plurality of power panels 100, 200, 300, 400 may be connected in the mesh shape through the plurality of DC electric circuits 1, as illustrated in FIG. 1. Accordingly, the first power panel 100 may be connected to the second power panel 200, the third power panel 300, and the fourth power panel 400, so as to receive or supply the DC power together with the second power panel 200, the third power panel 300 or the fourth power panel 400, the second power panel 200 may be connected to the first power panel 100, the third power panel 300, and the fourth power panel 400, so as to receive or supply the DC power together with the first power panel 100, the third power panel 300 or the fourth power panel 400, and the third power panel 300 may be connected to the first power panel 100, the second power panel 200, and the fourth power panel 400, so as to receive or supply the DC power together with the first power panel 100, the second power panel 200 or the fourth power panel 400, and the fourth power panel 400 may be connected to the first power panel 100, the second power panel 200, and the third power panel 300, so as to receive or supply the DC power together with the first power panel 100, the second power panel 200 or the third power panel 300.

In this way, the plurality of power panels 100, 200, 300, 400 connected in the mesh form through the plurality of DC electric circuits 1 may receive or supply the DC power among one another by way of opening or closing of the plurality of circuit breakers 130.

For example, when the first circuit breaker 130*a* connected to the electric circuit between the first power panel 100 and the third power panel 300 is closed, the reception and supply of the DC power between the first power panel 100 and the third power panel 300 may be allowed. When the second circuit breaker 130*b* connected to the electric circuit between the first power panel 100 and the second power panel 200 is closed, the reception and supply of the DC power between the first power panel 100 and the second power panel 300 may be allowed. When the third circuit breaker 130*c* connected to the electric circuit between the first power panel 100 and the fourth power panel 400 is closed, the reception and supply of the DC power between the first power panel 100 and the fourth power panel 400 may be allowed. When the fourth circuit breaker 130*d* connected to the electric circuit between the second power panel 200 and the third power panel 300 is closed, the reception and supply of the DC power between the second power panel 200 and the third power panel 300 may be allowed. When the fifth circuit breaker 130*e* connected to the electric circuit between the third power panel 300 and the fourth power panel 400 is closed, the reception and supply of the DC power between the third power panel 300 and the fourth power panel 400 may be allowed. When the sixth circuit breaker 130*f* connected to the electric circuit between the second power panel 200 and the fourth power panel 400 is closed, the reception and supply of the DC power between the second power panel 200 and the fourth power panel 400 may be allowed.

Each of the plurality of power panels 100, 200, 300, 400 may control and monitor the operations of the at least one first power conversion device 110, 210, 310, 410 and the second power conversion device 120, 220, 320, 420 included therein.

Each of the plurality of power panels 100, 200, 300, 400 may control the opening and closing of each of the first to fourth circuit breakers 130*a* to 130*d* according to a result of controlling and monitoring the operations of the at least one first power conversion device 110, 210, 310, 410 and the second power conversion device 120, 220, 320, 420 included therein.

Each of the plurality of power panels 100, 200, 300, 400 may control and monitor the operations of the at least one first power conversion device 110, 210, 310, 410 and the second power conversion device 120, 220, 320, 420 included therein to detect the states of the DC power and the driving power.

Each of the plurality of power panels 100, 200, 300, 400 may receive power from any one of the at least one power supply source 10 to convert the power into the DC power.

In other words, each of the plurality of power panels 100, 200, 300, 400 may selectively receive power from any one of the at least one power supply source 10.

Each of the plurality of power panels 100, 200, 300, 400 may receive power from any one of the at least one power supply source 10 according to a preset supply criterion and convert the power into the DC power.

The supply criterion may be a criterion for priority of power supply of the at least one power supply source 10.

The plurality of power panels 100, 200, 300, 400 may select any one of the at least one first power conversion device 110, 210, 310, 410 according to the state of the at least one power supply source 10 to transfer the DC power to the second power conversion device 120, 220, 320, 420 through the selected conversion device.

That is, each of the plurality of power panels 100, 200, 300, 400 may transfer the DC power to the second power conversion device 120, 220, 320, 420 through one conversion device selected according to the state of the at least one power supply source 10.

When a fault has occurred in at least one of one conversion device which is transferring the DC power to the second power conversion device 120, 220, 320, 420 and a power supply source corresponding to the one conversion device, each of the plurality of power panels 100, 200, 300, 400 may transfer the DC power to the second power conversion device 120, 220, 320, 420 through another conversion device other than the one conversion device.

That is, when a fault has occurred in at least one of one conversion device which is transferring the DC power and a power supply source corresponding to the one conversion device, each of the plurality of power panels 100, 200, 300, 400 may switch the one conversion device to another conversion device, to transfer the DC power to the second power conversion device 120, 220, 320, 420 through the another conversion device.

When a fault has occurred in at least one of any one conversion device which is transferring the DC power to the second power conversion device 120, 220, 320, 420 and a power supply source corresponding to the one conversion device, each of the plurality of power panels 100, 200, 300, 400 may switch the power supply source which is supplying power and the one conversion device, such that the DC power is transferred to the second power conversion device 120, 220, 320, 420 through another conversion device other than the one conversion device.

When the power supply of at least one of the plurality of power panels 100, 200, 300,400 is interrupted, a circuit breaker of a power panel which is interrupted in power supply and a circuit breaker of a power panel adjacent to the interrupted power panel, among the plurality of circuit breakers, may be closed to connect the interrupted power panel and the adjacent power panel through the plurality of DC electric circuits 1, such that the DC power is supplied from the adjacent power panel to the interrupted power panel.

In this case, the interrupted power panel may supply the DC power through a conversion device connected to the battery power source B until the DC power is supplied from the adjacent power panel after the power supply is interrupted.

The system 1000 with such configuration may further include a control device 600 that monitors a state of at least one of the plurality of power panels 100, 200, 300, 400 and the plurality of circuit breakers 130 to control the at least one of the plurality of power panels 100, 200, 300, 400 and the plurality of breakers 130 according to a result of the monitoring.

In other words, the plurality of power panels 100, 200, 300, 400 may be controlled by the control device 600.

Each of the plurality of power panels 100, 200, 300, 400 may communicate with the control device 600 to operate according to a result of the communication with the control device 600.

For example, the plurality of power panels 100, 200, 300, 400 may receive a control command from the control device 600, so as to operate according to the control command or transfer state information to the control device 600.

Each of the plurality of power panels 100, 200, 300, 400 may request the control device 600 to control opening or closing of the first to fourth circuit breakers 130a to 130d according to a result of controlling and monitoring the operations of the at least one first power conversion device 110, 210, 310, 410 and the second power conversion device 120, 220, 320, 420 included therein.

Each of the plurality of power panels 100, 200, 300, 400 may transmit the control and monitoring results of the at least one first power conversion device 110, 210, 310, 410 and the second power conversion device 120, 220, 320, 420 to the control device 600.

Each of the plurality of power panels 100, 200, 300, 400 may control and monitor the operations of the at least one first power conversion device 110, 210, 310, 410 and the second power conversion device 120, 220, 320, 420, and transmit a result of detecting the states of the DC power and the driving power to the control device 600.

Here, each of the plurality of power panels 100, 200, 300, 400 may further include a control unit 140, 240, 340, 440 that controls the at least one first power conversion device 110, 210, 310, 410 and the second power conversion device 120, 220, 320, 420, and monitors a fault state of at least one of the at least one power supply source 10, the at least one first power conversion device 110, the DC power, the driving power, and the load 20.

The control units 140, 240, 340, 440 may be central control devices of the plurality of power panels 100, 200, 300, 400, respectively.

The control units 140, 240, 340, 440 may include a plurality of control elements for controlling the plurality of power panels 100, 200, 300, 400.

The control units 140, 240, 340, 440 may further include a plurality of electronic devices for performing functions of the plurality of power panels 100, 200, 300, 400.

For instance, the control units 140, 240, 340, 440 may include at least one of a storage element that stores software/applications/programs for performing and controlling functions of the plurality of power panels 100, 200, 300, 400, a dedicated control element including the storage element, a communication element, a display, and an input element.

In other words, the control units 140, 240, 340, 440 may be controlled by the control device 600.

The control unit 140, 240, 340, 440 may include a programmable logic controller (PLC) that controls the at least one first power conversion device 110, 210, 310, 410, and the second power conversion device 120, 220, 320, 420.

The control unit 140, 240, 340, 440 may monitor the states of the at least one first power conversion device 110, 210, 310, 410, and the second power conversion device 120, 220, 320, 420, and control the operations of the at least one first power conversion device 110, 210, 310, 410, and the second power conversion device 120, 220, 320, 420 based on a result of the monitoring.

The control unit 140, 240, 340, 440 may also control the operations of the at least one first power conversion device 110, 210, 310, 410 and the second power conversion device 120, 220, 320, 420 based on the states of the at least one power supply source 10 and the load 20.

The control unit 140, 240, 340, 440 may control the operation of each of the at least one first power conversion device 110, 210, 310, 410 to control the conversion and supply of the DC power.

The control unit 140, 240, 340, 440 may also control the opening and closing of each opening and closing mechanism included in the at least one first power conversion device 110, 210, 310, 410.

The control unit 140, 240, 340, 440 may control the operation of the second power conversion device 120, 220, 320, 420 to control the conversion and supply of the driving power.

The control unit 140, 240, 340, 440 may also control the opening and closing of the opening and closing mechanism included in the second power conversion device 120, 220, 320, 420.

The control unit 140, 240, 340, 440 may also perform communication with at least one of an external communication device and the control device 600 to control the operations of the at least one first power conversion device 110, 210, 310, 410, and the second power conversion device 120, 220, 320, 420 according to a result of the communication.

For instance, the control unit 140, 240, 340, 440 may receive a control command for controlling the operations of the at least one first power conversion device 110, 210, 310, 410 and the second power conversion device 120, 220, 320, 420 from the control device 600, so as to control the operations of the at least one first power conversion device 110, 210, 310, 410 and the second power conversion device 120, 220, 320, 420 according to the control command.

The control unit 140, 240, 340, 440 may receive power from any one of the at least one power supply source 10 to control the conversion of the power into the DC power.

In other words, the control unit 140, 240, 340, 440 may selectively receive power from any one of the at least one power supply source 10.

The control unit 140, 240, 340, 440 may receive power from any one of the at least one power supply source 10 according to a preset supply criterion and convert the power into the DC power.

The supply criterion may be a criterion for priority of power supply of the at least one power supply source 10.

For example, the supply criterion may be set in the order of the first AC power source 10 #1, the second AC power source 10 #3, and the battery power source 10 #2.

When the supply criterion is as described above, the control unit 140, 240, 340, 440 may control the supply of power in the order of the first AC power source 10 #1, the second AC power source 10 #3, and the battery power source 10 #2.

When power is supplied from the first AC power source 10 #1, the control unit 140, 240, 340, 440 may control the operation of the first conversion device 110 #1, 210 #1, 310 #1, 410 #1 connected to the first AC power source 10 #1.

In this case, the control unit 140, 240, 340, 440 may close the opening and closing mechanism of the first conversion device 110 #1, 210 #1, 310 #1, 410 #1, and open the opening and closing mechanisms of the second conversion device 110 #2, 210 #2, 310 #2, 410 #2 and the third conversion device 110 #3, 210 #3, 310 #3, 410 #3, so as to connect the first conversion device 110 #1, 210 #1, 310 #1, 410 #1 and disconnect the second conversion device 110 #2, 210 #2, 310 #2, 410 #2 and the third conversion device 110 #3, 210 #3, 310 #3, 410 #3.

When power is supplied from the second AC power source 10 #3, the control unit 140, 240, 340, 440 may control the operation of the third conversion device 110 #3, 210 #3, 310 #3, 410 #3 connected to the second AC power source 10 #3.

In this case, the control unit 140, 240, 340, 440 may close the opening and closing mechanism of the third conversion device 110 #3, 210 #3, 310 #3, 410 #3, and open the opening and closing mechanisms of the first conversion devices 110 #1, 210 #1, 310 #1, 410 #1 and the second conversion device 110 #2, 210 #2, 310 #2, 410 #2, so as to connect the third conversion device 110 #3, 210 #3, 310 #3, 410 #3, and disconnect the first conversion device 110 #1, 210 #1, 310 #1, 410 #1 and the second conversion device 110 #2, 210 #2, 310 #2, 410 #2.

When power is supplied from the battery power source 10 #2, the control unit 140, 240, 340, 440 may control the operation of the second conversion device 110 #2, 210 #2, 310 #2, 410 #2 connected to the battery power source 10 #2.

In this case, the control unit 140, 240, 340, 440 may close the opening and closing mechanism of the second conversion device 110 #2, 210 #2, 310 #2, 410 #2, and open the opening and closing mechanisms of the first conversion device 110 #1, 210 #1, 310 #1, 410 #1, and the third conversion device 110 #3, 210 #3, 310 #3, 410 #3, so as to connect only the second conversion device 110 #2, 210 #2, 310 #2, 410 #2, and disconnect the first conversion device 110 #1, 210 #1, 310 #1, 410 #1 and the third conversion device 110 #3, 210 #3, 310 #3, 410 #3.

The control unit 140, 240, 340, 440 may select any one of the at least one first power conversion device 110, 210, 310, 410 according to the state of the at least one power supply source 10, so as to control the selected conversion device to transfer the DC power to the second power conversion device 120, 220, 320, 420.

In other words, the control unit 140, 240, 340, 440 may convert power into the DC power through a conversion device selected from the at least one first power conversion device 110, 210, 310, 410 and transfer the converted DC power to the second power conversion device 120, 220, 320, 420.

For instance, when fault conditions have occurred in the first AC power source 10 #1 and the second AC power source 10 #3 of the at least one power supply source 10, the control unit 140, 240, 340, 440 may select the second conversion device 110 #2, 210 #2, 310 #2, 410 #2 connected to the battery power source 10 #2, convert power received from the battery power source 10 #2 into the DC power through the selected second conversion device 110 #2, 210 #2, 310 #2, 410 #2, and transfer the DC power to the second power conversion device 120, 220, 320, 420.

When a fault has occurred in at least one of any one conversion device 110, 210, 310, 410 which is transferring the DC power to the second power conversion device 120, 220, 320, 420 and a power supply source 10 corresponding to the one conversion device 110, 210, 310, 410, the control unit 140, 240, 340, 440 may control another conversion device 110, 210, 310, 410 other than the one conversion device 110, 210, 310, 410 to transfer the DC power to the second power conversion device 120, 220, 320, 420.

When a fault has occurred in at least one of any one conversion device 110, 210, 310, 410 which is transferring the DC power to the second power conversion device 120, 220, 320, 420 and a power supply source 10 corresponding to the one conversion device 110, 210, 310, 410, the control unit 140, 240, 340, 440 may switch the power supply source 10 that is supplying power and the one conversion device 110, 210, 310, 410, such that the DC power is transferred to the second power conversion device 120, 220, 320, 420 through another conversion device 110, 210, 310, 410 other than the one conversion device 110, 210, 310, 410.

For example, when the first conversion device 110 #1, 210 #1, 310 #1, 410 #1 fails or when the first AC power source 10 #1 is shut down while receiving power from the first AC power source 10 #1 and converting the power into the DC power through the first conversion device 110 #1, 210 #1, 310 #1, 410 #1, the control unit 140, 240, 340, 440 may switch the first AC power source 10 #1 which is supplying power to the second AC power source 10 #3 and the first conversion device 110 #1, 210 #1, 310 #1, 410 #1 to the third conversion device 110 #3, 210 #3, 310 #3, 410 #3, so as to receive power from the second AC power source 10 #3, convert the power into the DC power through the third conversion device 110 #3, 210 #3, 310 #3, 410 #3, and transfer the DC power to the second power conversion device 120, 220, 320, 420.

In this way, the control unit 140, 240, 340, 440 that controls the at least one first power conversion device 110, 210, 310, 410 and the second power conversion device 120, 220, 320, 420 may request the control device 600 to receive or supply the DC power according to the state of the DC power or the driving power.

For example, when the magnitude of the driving power is less than the required magnitude of the load 20, or when the DC power is insufficient, the control unit 140, 240, 340, 440 may request the control device 600 to receive the DC power from another power panel 100, 200, 300, or 400 by closing the plurality of circuit breakers 130.

For example, when the magnitude of the driving power is greater than the required magnitude of the load 20, or when the DC power is sufficient, the control unit 140, 240, 340, 440 may request the control device 600 to close the plurality of circuit breakers 130 so as to supply the DC power to the another power panel 100, 200, 300, or 400.

In an opposite case, when a fault current flows to the power end O1 to O4 due to a failure occurring in the at least one first power conversion device 110, 210, 310, 410 or the second power conversion device 120, 220, 320, 420, or when the fault current flows to the power end O1 to O4 due to an abnormality occurring in the at least one power supply source 10 or the load 20, the control unit 140, 240, 340, 440 may request the control device 600 to open the plurality of circuit breakers 130 so as to prevent the fault current from being supplied to the another power panel 100, 200, 300, or 400.

When a fault has occurred in the at least one power supply source 10, the control unit 140, 240, 340, 440 may request the control device 600 to close the plurality of circuit breakers 130 so as to receive the DC power from the another power panel 100, 200, 300, or 400 connected to the power end O1 to O4.

When a fault has occurred in the another power panel 100, 200, 300, or 400 connected to the power end O1 to O4, the control unit 140, 240, 340, 440 may request the control device 600 to close the plurality of circuit breakers 130 so as to supply DC power to the another power panel 100, 200, 300, or 400.

When a fault has occurred in the another power panel 100, 200, 300, or 400 connected to the power end O1 to O4, the control unit 140, 240, 340, 440 may request the control device 600 to further receive power from any one of the at least one power supply source 10 and to close the plurality of circuit breakers 130, so as to convert the power further received from the power supply source 10 into the DC power through one conversion device 110, 210, 310, 410 corresponding to the power supply source 10, and supply the DC power to the another power panel 100, 200, 300, or 400 through the power end O1 to O4.

The control device 600 may control the operations of the plurality of circuit breakers 130 to control the reception and supply of the DC power.

For instance, the control device 600 may close the plurality of circuit breakers 130 so as to control the reception or supply of the DC power among the plurality of power panels 200, 200, 300, 400.

The control device 600 may communicate with each of the plurality of power panels 100, 200, 300, 400 to control each of the plurality of power panels 100, 200, 300, 400 based on state information received from each of the plurality of power panels 100, 200, 300, 400.

For example, the control device 600 may control the conversion and supply of the DC power and the conversion and supply of the driving power in each of the plurality of power panels 100, 200, 300, 400, based on state information related to the DC power and the driving power received from each of the plurality of power panels 100, 200, 300, 400.

The control device 600 may communicate with each of the plurality of power panels 100, 200, 300, 400 to control the conversion and supply of the driving power in each of the plurality of power panels 100, 200, 300, 400 or the operations of the plurality of circuit breakers 130, based on state information received from each of the plurality of power panels 100, 200, 300, 400.

The control device 600 may also detect the states of the at least one power supply source 10 and the load 20 or receive information related to the states of the at least one power supply source 10 and the load 20 from an external communication element, so as to control the conversion and supply of the driving power in each of the plurality of power panels 100, 200, 300, 400 or the operations of the plurality of circuit breakers 130 based on the states of the at least one power supply source 10 and the load 20.

In this case, the control device 600 may transmit a control command to the plurality of power panels 100, 200, 300, 400 or the plurality of circuit breakers, respectively, to control the conversion and supply of the driving power in each of the plurality of power panels 100, 200, 300, 400 or control the operations of the plurality of circuit breakers 100, 200, 300, 400. Then, the control unit 140, 240, 340, 440 included in each of the plurality of power panels 100, 200, 300, 400 may perform such control according to the control command or control the opening or closing of each of the plurality of circuit breakers 130.

For example, in order to cut off the power supply from the system power source G, which is supplying power to the plurality of power panels 100, 200, 300, 400, and switch the system power source G to another power supply source when a fault has occurred in the entire system power source G, the control device 600 may transmit a control command, for opening the plurality of circuit breakers 130 to receive power from power sources excluding the system power source G and converting the received power into the DC power for supply, to the control unit 140, 240, 340, 440 included in each of the plurality of power panels 100, 200, 300, 400. Then, the control unit 140, 240, 340, 440 may open the plurality of circuit breakers 130, 230, 330, 430 to receive power from the bypass power source P or the battery power source B and convert the received power into the DC power for supply.

The control device 600 may control the opening and closing of the plurality of circuit breakers 130 to allow the plurality of power panels 100, 200, 300, 400 to receive the DC power.

When a fault has occurred in at least one of the plurality of power panels 100, 200, 300, 400, the control device 600 may close a circuit breaker on any one of the electric circuits connected to the fault-occurred power panel, such that the fault-occurred power panel receives the DC power from another power panel.

In other words, when a fault has occurred in at least one of the plurality of power panel 100, 200, 300, 400, the control device 600 may close any one of the circuit breakers 130 connected to the fault-occurred power panel, such that the fault-occurred power panel receives the DC power from another power panel.

For example, in order to supply DC power converted in any one conversion device 210, 310, or 410 of the second power panel 200, the third power panel 300, or the fourth power panel 400 to the second power conversion device 120 of the first power panel 100 when a failure has occurred in the conversion device 110 of the first power panel 100 among the plurality of power panels 100, 200, 300, 400, the control device 600 may transmit a control command to the first power panel 100 and the second power panel 200, the third power panel 300, or the fourth power panel 400, or the first circuit breaker 130a, the second circuit breaker 130b, or the third circuit breaker 130c, respectively, to close the first circuit breaker 130a on the electric circuit connected to the first power panel 100 and the third power panel 300, the second circuit breaker 130b on the electric circuit connected to the first power panel 100 and the second power panel 200, or the third circuit breaker 130c on the electric circuit connected to the first power panel 100 and the fourth power panel 400, shut down the at least one first power conversion device 110 of the first power panel 100, and supply the DC power converted in the at least one first power conversion device 210, 310 or 410 of the second power panel 200, the third power panel 300, or the fourth power panel 400 to the second power conversion device 120 of the first power panel 100. Accordingly, the first circuit breaker 130a, the second circuit breaker 130b, or the third circuit breaker 130c may be closed and thus the DC power may be supplied to the second power conversion device 120 of the first power panel 100 through one of the at least one first power conversion device 210, 310, or 410 of the second power panel 200, the third power panel 300, or the fourth power panel 400.

In other words, when a fault has occurred in any one power panel, each of the plurality of power panels 100, 200, 300, 400 may supply the DC power to the load 20 of the fault-occurred power panel.

Here, when the DC power is supplied to the fault-occurred power panel, the plurality of power panels 100, 200, 300, 400 may select any one of the at least one first power conversion device 110, 210, 320, 410 that converts power into the DC power according to the state of the at least one power supply source 10 and transfer the DC power to the fault-occurred power panel through the selected converter.

In other words, when the DC power is supplied to the fault-occurred power panel, the plurality of power panels 100, 200, 300, 400 may supply the DC power to the fault-occurred power panel through one converter selected according to the state of the at least one power supply source 10.

For instance, when a rating of the system power source G and the bypass power source P of the at least one power supply source 10 that is supplying power to the second power panel 200 is lower than a reference rating while the second power panel 200 supplies the DC power to the first power panel 100, the second conversion device 210 #2 corresponding to the battery power source B may be selected to supply the DC power through the battery power source B. Accordingly, the power supplied from the battery power source B may be converted into the DC power through the second conversion device 210 #2 such that the DC power is transferred to the first power panel 100.

When a fault has occurred in at least one of the plurality of power panels 100, 200, 300, 400, the control device 600 may close at least two of the circuit breakers 130 on electric circuits connected to the fault-occurred power panel, such that the fault-occurred power panel receives the DC power from at least two other power panels.

In other words, when a fault has occurred in at least one of the plurality of power panels 100, 200, 300, 400, the control device 600 may close any two of the circuit breakers 130 connected to the fault-occurred power panel, such that the fault-occurred power panel receives the DC power from at least two other power panels.

For instance, when a fault has occurred in the first power panel 100, the control device 600 may close the second circuit breaker 130b for controlling the connection between the first power panel 100 and the second power panel 200 adjacent to the first power panel 100 and the first circuit breaker 130a for controlling the connection between the first power panel 100 and the third power panel 300, such that the first power panel 100 receives the DC power from the second power panel 200 and the third power panel 300.

When there is a plurality of fault-occurred power panels, the control device 600 may close the plurality of circuit breakers 130 that controls the connection between the fault-occurred power panels and adjacent power panels, respectively, such that each of the fault-occurred power panels receives the DC power from each of the adjacent power panels.

In other words, when there is a plurality of fault-occurred power panels, the control device 600 may control each of a plurality of power panels adjacent to each of the fault-occurred power panels to supply the DC power to each of the fault-occurred power panels.

For instance, when a failure has occurred in the first power panel 100 and the second power panel 200, the control device 600 may close the first circuit breaker 130a that controls the connection between the first power panel 100 and the third power panel 300 and the fourth circuit breaker 130d that controls the connection between the second power panel 200 and the fourth power panel 400, such that the first power panel 100 receives the DC power from the third power panel 300 and the second power panel 200 receives the DC power from the fourth power panel 400.

As described above, when a fault has occurred in at least one of the plurality of power panels 100, 200, 300, 400, the control device 600 may close the circuit breaker 130 that controls the connection of the fault-occurred power panel to other power panels, such that the fault-occurred power panel receives the DC power from the other power panels, which may enable the UPS function among the plurality of power panels 100, 200, 300, 400.

Accordingly, even when an unexpected abnormality occurs in the at least one power supply source 10, the plurality of power panels 100, 200, 300, 400, and the plurality of loads 20, the supply of the driving power to the plurality of loads 20 may be maintained. Accordingly, the plurality of loads 20 can be operated with no interruption, an appropriate and active power supply response to an abnormality occurrence can be made, and the operations of the plurality of loads 20 and the control of the power supply system 1000 may be stably performed regardless of the type and extent of the abnormality occurrence.

Hereinafter, the operation of the power supply system 1000 will be described with reference to FIGS. 4 to 7.

FIGS. 4 to 7 illustrates an example in which the power supply system 1000 includes four power panels 100, 200, 300, 400. The number of the plurality of power panels 100, 200, 300, 400, 400 included in the power supply system 1000 may be fewer or greater than 5 or may be 5.

A preferred embodiment of the power supply system 1000, as illustrated in FIGS. 4 to 7, may include four power panels 100, 200, 300, 400. Hereinafter, a case where the number of the plurality of power panels 100, 200, 300, 400 is four, as illustrated in FIGS. 4 to 7, will be described as an example.

FIG. 4 illustrates a case where each of the plurality of power panels 100, 200, 300, 400 receives power from the system power source G of the at least one power supply source 10. In this case, power may be received from the system power source G, with shutting down the power supply from the bypass power source P and the battery power source B. The supplied power may be converted sequentially into the DC power and the driving power so as to be supplied to each of the plurality of loads 20.

The example of the operation as illustrated in FIG. 4 is a case of a typical operation in which power is supplied for operation from the system power source G, and a normal operation of the system 1000 may be performed in this manner.

Figure 5:
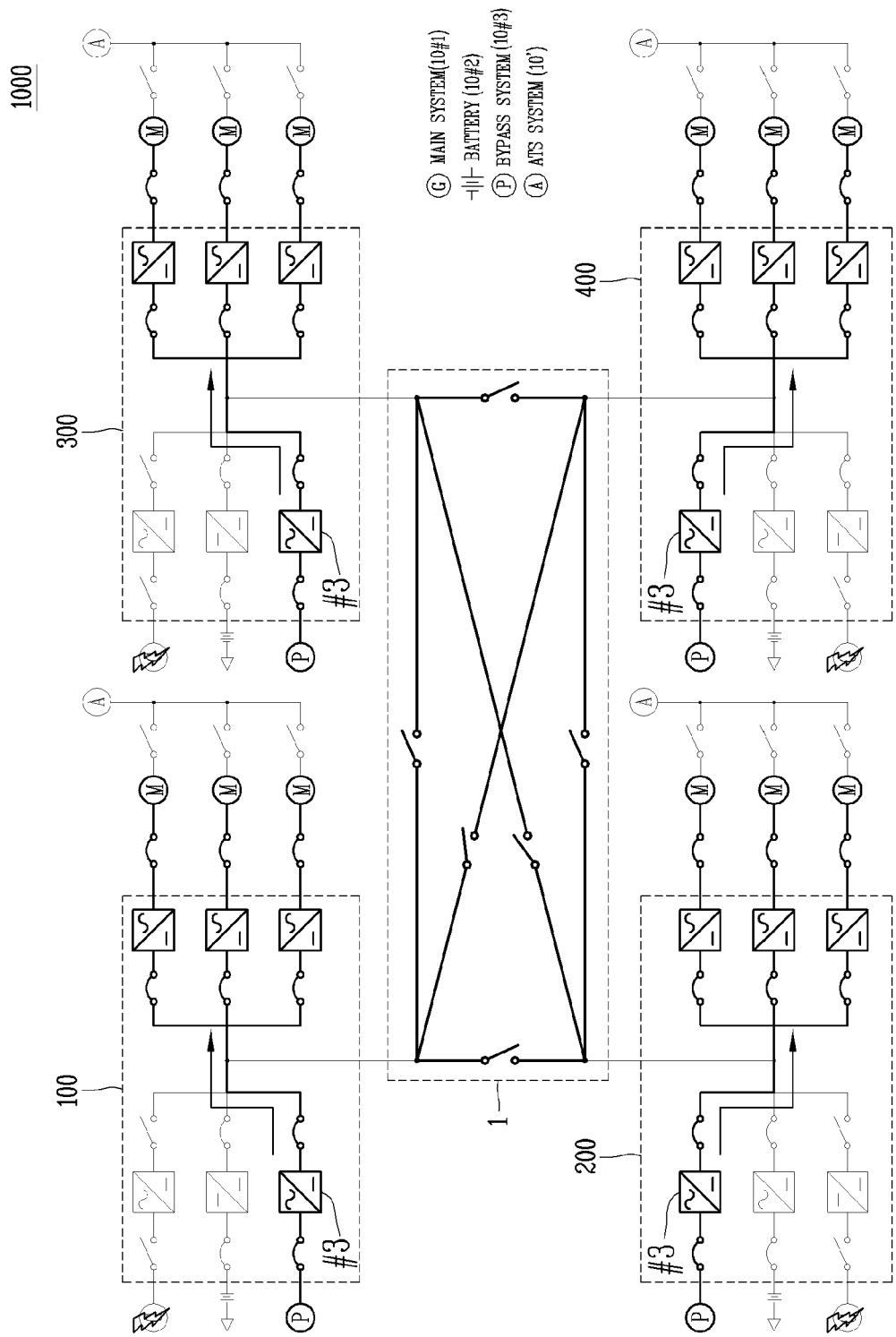
FIG. 5 is an exemplary view 2 illustrating a detailed embodiment of a power supply system in accordance with the present disclosure.

FIG. 5 illustrates a case where each of the plurality of power panels 100, 200, 300, 400 receives power from the bypass power supply P of the at least one power supply source 10, which corresponds to a case in which a fault has occurred in the system power source G. In this case, power may be received from the bypass power source P, with shutting down the power supply from the system power source G and the battery power source B. The supplied power may be converted sequentially into the DC power and the driving power so as to be supplied to each of the plurality of loads 20.

The example of the operation as illustrated in FIG. 5 is a case of a specific operation in which the power supply system 1000 is operated by receiving power from the bypass power source P. The specific operation of the power supply system 1000 may be carried out in this manner.

Figure 6:
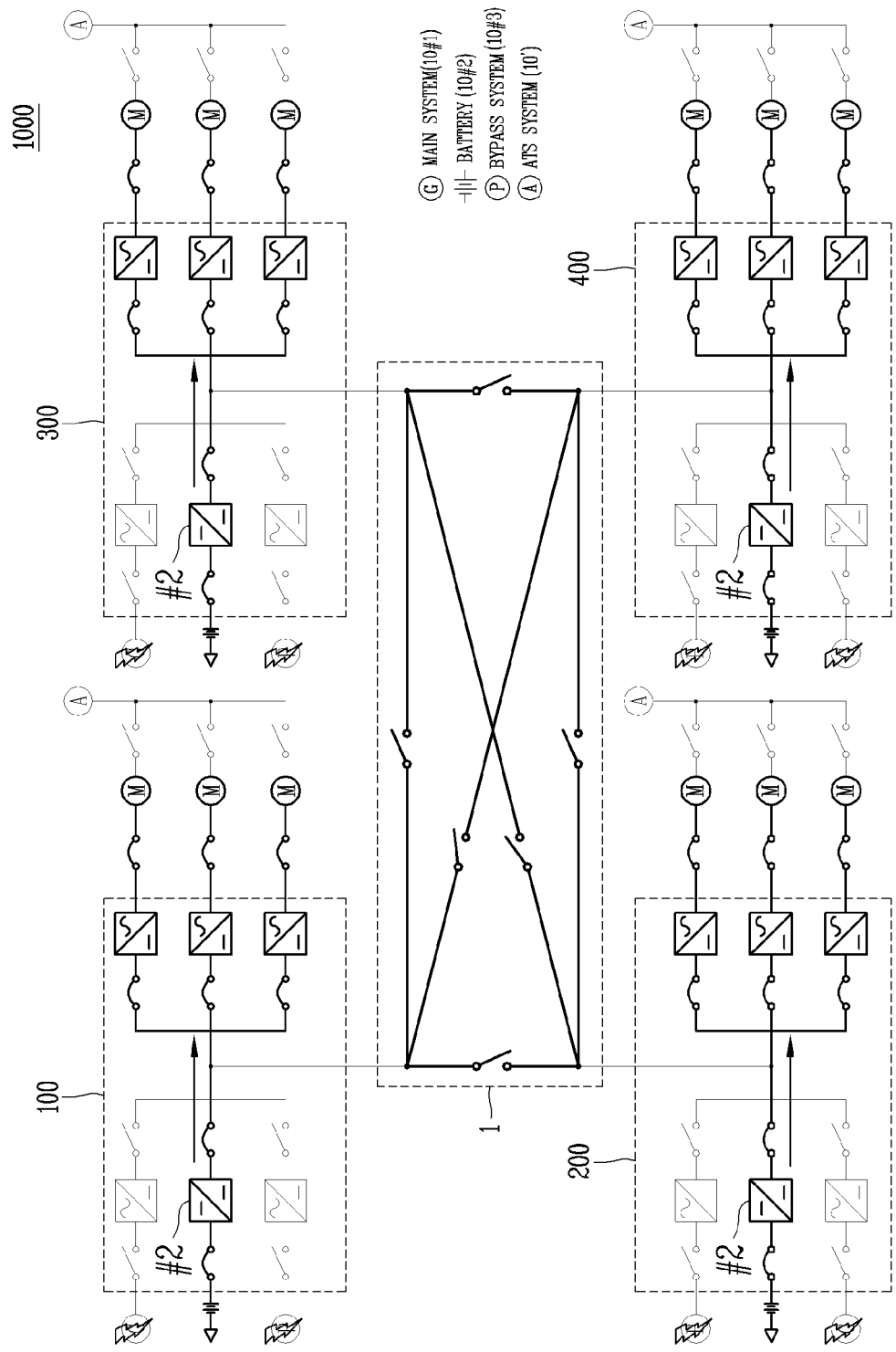
FIG. 6 is an exemplary view 3 illustrating a detailed embodiment of a power supply system in accordance with the present disclosure.

FIG. 6 illustrates a case where each of the plurality of power panels 100, 200, 300, 400 receives power from the battery power source B of the at least one power supply source 10, which corresponds to a case in which fault conditions have occurred in the system power source G and the bypass power source P. In this case, power may be received from the battery power source B, with shutting down the power supply from the system power source G and the bypass power source P. The supplied power may be converted sequentially into the DC power and the driving power so as to be supplied to each of the plurality of loads 20.

The example of the operation as illustrated in FIG. 6 is a case of an interruption operation in which the power supply system 1000 is operated by receiving power from the battery power source B. Such interruption operation of the power supply system 1000 may be carried out in this manner.

FIG. 7 illustrates a case where each of the plurality of power panels 100, 200, 300, 400 receives power from the emergency power source A of the at least one power supply source 10, which corresponds to a case in which fault conditions have occurred in the system power source G, the bypass power source P, and the battery power source B. In this case, the emergency power source A may supply the driving power directly to each of the plurality of loads 20 while the power supply from the system power source G, the bypass power source P, and the battery power source B is shut down.

The example of the operation as illustrated in FIG. 7 is a case of an emergency operation in which the power supply system 1000 is operated by receiving power from the emergency power source A. Such emergency operation of the power supply system 1000 may be carried out in this manner.

In this way, the power supply system 1000 may be configured such that each of the plurality of power panels 100, 200, 300, 400 is operated by receiving power from the same power supply source or selectively from one of the at least one power supply source 10.

For example, the first and second power panels 100 and 200 may be operated by receiving power from the system power source G, and the third and fourth power panels 300 and 400 may be operated by receiving power from the bypass power source P.

Furthermore, each of the plurality of power panels 100, 200, 300, 400 may be operated by receiving power from one or more power supply sources 10.

For example, when the DC power is supplied from the second power panel 200 to the first power panel 100 due to a fault occurred in the first power panel 100, the second power panel 200 may convert power supplied from the system power source G into the DC power through a 2-1th conversion device 210 #1 and transfer the DC power to the second power conversion device 220. The second power panel 200 may further receive power from the bypass power source P, convert the further-received power into the DC power through a 2-3th conversion device 210 #3, and transfer the DC power converted in the 2-3th conversion device 210 #3 to the second power conversion device 120 of the first power panel 100.

In the example, the first power panel 100 and the second power panel 200 may be connected to each other by closing the second circuit breaker 130b connected to the first power panel 100 and the second power panel 200, so as allow the supply of the DC power from the second power panel 200 to the first power panel 100.

In this way, each of the plurality of power panels 100, 200, 300, 400 can be operated by receiving power from one or more power supply sources 10, which may allow the power supply among the plurality of power panels 100, 200, 300, 400, namely, the UPS function among the plurality of power panels 100, 200, 100 300, 400, and the UPS function of the supply panel 500.

The embodiments of the power supply system according to the present disclosure may be applied to a power supply device, a power supply system, and a method for operating the power supply system that supply/use DC power. In particular, the embodiments described above may be usefully applied to a DC UPS module and a power supply system having the same, and may also be applied to a motor control panel, a motor control system, a motor driving system, etc. for controlling a plurality of motor loads.

Although a specific embodiment according to the present disclosure has been described so far, various modifications may be made thereto without departing from the scope of the present disclosure. Therefore, the scope of the present disclosure should not be defined by being limited to the foregoing embodiments, and should be defined not only by the claims to be described later but also by equivalents of the claims.

As described above, although the present disclosure has been described by the limited embodiments and drawings, the present disclosure is not limited to the above embodiments, and various modifications and changes may be made from the disclosure by those skilled in the art. Therefore, the idea of the present disclosure should be construed only by the claims set forth below, and all equivalent or equivalent modifications thereof will be said to belong to the scope of the idea of the present disclosure.

BRIEF DESCRIPTION OF REFERENCE NUMERALS

10: Power supply source 20: Load
100 (200, 300, 400): Power supply device (Power panel)
110 (210, 310, 410): First power conversion device (Converter)
120 (220, 320, 420): Second power conversion device (Inverter)
130a to 130f: First to sixth circuit breakers
140 (240, 340, 440): Control unit
600: Control device 1000: Power supply system

The invention claimed is:

1. A power supply system comprising:
a plurality of power panels to convert power supplied from at least one power supply source into Direct-Current (DC) power, convert the DC power into driving power of a load, and supply the driving power to the load; and
a plurality of circuit breakers disposed between adjacent power ends, through which the DC power is input and output in the plurality of power panels, respectively, wherein the plurality of circuit breakers connect respective power ends of each power panel of the plurality of power panels to each other power panel of the plurality of power panels,
wherein the plurality of circuit breakers is opened or closed depending on a power supply state of at least one of the plurality of power panels, so as to connect or disconnect the DC power among the plurality of power panels, and
wherein when a power supply of a given power panel of the plurality of power panels is interrupted, a circuit breaker of the plurality of circuit breakers that is connected to the given power panel is closed to uninterruptedly supply the given power panel with the DC power from a different one of a given pair of power panels that the circuit breaker is connected to.

2. The power supply system of claim 1, wherein the at least one power supply source comprises:
   a first Alternating-Current (AC) power source and a second AC power source to supply AC power; and
   a battery power source to store DC power therein so as to supply the stored DC power therein to the plurality of power panels while power supply of the first AC power source and the second AC power source is restored, when the power supply of the first AC power source and the second AC power source is interrupted.

3. The power supply system of claim 2, wherein the battery power source uninterruptibly supplies the stored DC power to the plurality of power panels until the power supply is restored in a switching manner after the power supply is interrupted.

4. The power supply system of claim 2, wherein the at least one power supply source further comprises:
   an emergency power source to supply emergency power to the load when the power supply of the first AC power source, the second AC power source, and the battery power source is interrupted.

5. The power supply system of claim 2, wherein each of the plurality of power panels comprises:
   at least one first power conversion device to convert power supplied from the at least one power supply source into the DC power; and
   a second power conversion device to convert the DC power supplied from the at least one first power conversion device into the driving power and supply the driving power to the load.

6. The power supply system of claim 5, wherein the plurality of power panels is configured such that the DC power is supplied to the second power conversion device through any one of the at least one first power conversion device according to a state of the at least one power supply source.

7. The power supply system of claim 6, wherein the plurality of power panels is configured such that, in a case where power supply of any one conversion device that supplies the DC power to the second power conversion device is interrupted, the DC power is supplied to the second power conversion device through another conversion device other than the one conversion device.

8. The power supply system of claim 7, wherein the at least one first power conversion device is configured such that the DC power is supplied to the second power conversion device through a conversion device which receives power from the battery power source, while the one conversion device is switched to the another conversion device.

9. The power supply system of claim 2, further comprising:
   a plurality of DC electric circuits through which the power ends are connected to one another,
   wherein the plurality of circuit breakers is arranged on the plurality of DC electric circuits, respectively, to connect or disconnect the DC power on the plurality of DC electric circuits.

10. The power supply system of claim 2, wherein the plurality of circuit breakers is closed when connecting the DC power among the plurality of power panels, and opened when disconnecting the DC power among the plurality of power panels.

11. The power supply system of claim 1, wherein the plurality of circuit breakers is disposed between the power ends of the plurality of power panels, wherein a single circuit breaker of the plurality of circuit breakers separates any given pair of power panels of the plurality of power panels.

12. The power supply system of claim 1, wherein the plurality of circuit breakers is provided by a number of N(N−1)/2 when a number of the plurality of power panels is N for any given whole number for N.

13. The power supply system of claim 1, wherein the plurality of circuit breakers is configured such that, when the power supply of the given power panel is interrupted, a second circuit breaker and a third circuit breaker of the plurality of circuit breakers connected respectively to a second different power panel and a third different power panel of the plurality of power panels are closed to connect the given power panel so as to supply the DC power from the different one of the given pair of power panels, the second different power panel, and the third different power panel to the given power panel.

14. The power supply system of claim 1, wherein the given power panel is configured such that the DC power is supplied through a conversion device connected to a battery power source until the DC power is supplied from the different one power panel of the given pair of power panels after the power supply is interrupted.

15. The power supply system of claim 1, further comprising:
   a control device to monitor a state of at least one of the plurality of power panels and the plurality of circuit breakers to control the at least one of the plurality of power panels and the plurality of circuit breakers.

* * * * *